(12) United States Patent
Buck

(10) Patent No.: US 10,011,407 B2
(45) Date of Patent: Jul. 3, 2018

(54) PORTABLE PACKAGING SYSTEM

(71) Applicant: SNACKTOPS, INC., Carlsbad, CA (US)

(72) Inventor: Ronald Mark Buck, Encinitas, CA (US)

(73) Assignee: SNACKTOPS, Inc., Carlsbad, CA (US)

( * ) Notice: Subject to any disclaimer, the term of this patent is extended or adjusted under 35 U.S.C. 154(b) by 103 days.

(21) Appl. No.: 15/287,700

(22) Filed: Oct. 6, 2016

(65) Prior Publication Data

US 2017/0099997 A1    Apr. 13, 2017

Related U.S. Application Data

(60) Provisional application No. 62/239,485, filed on Oct. 9, 2015.

(51) Int. Cl.
| | |
|---|---|
| *B65D 51/28* | (2006.01) |
| *B65D 81/32* | (2006.01) |
| *B65D 21/02* | (2006.01) |
| *A47J 47/14* | (2006.01) |
| *B65D 43/02* | (2006.01) |

(Continued)

(52) U.S. Cl.
CPC ......... *B65D 51/28* (2013.01); *A47G 19/2272* (2013.01); *A47J 47/14* (2013.01); *B65D 1/34* (2013.01); *B65D 21/0209* (2013.01); *B65D 21/0217* (2013.01); *B65D 21/0219* (2013.01); *B65D 21/0224* (2013.01); *B65D 21/0233* (2013.01); *B65D 43/02* (2013.01);

(Continued)

(58) Field of Classification Search
CPC .......... B65D 51/28; B65D 81/3205; B65D 21/0209; B65D 21/0217; B65D 21/0219; B65D 21/0224; A47J 47/14
USPC ........... 220/23.83, 23.86, 23.87, 23.89, 23.2, 220/23.4, 23.6, 212; 206/501
See application file for complete search history.

(56) References Cited

U.S. PATENT DOCUMENTS

| | | | | |
|---|---|---|---|---|
| 4,520,716 A | * | 6/1985 | Hayes ..................... | A47J 31/02 99/295 |
| 5,180,079 A | * | 1/1993 | Jeng ..................... | A47G 19/065 206/217 |

(Continued)

OTHER PUBLICATIONS

International Search Report and Written Opinion dated Jan. 13, 2017 in PCT/US2016/055852 (15 pages).

(Continued)

*Primary Examiner* — Jeffrey Allen
*Assistant Examiner* — Jennifer Castriotta
(74) *Attorney, Agent, or Firm* — Manuel de la Cerra

(57) ABSTRACT

A portable packaging system is disclosed that includes a food container, a beverage container lid and a tray. The food container has a bottom and a wall extending from the bottom that defines a food container footprint. The lid has a rim coupling structure that detachably couples to the rim of a beverage container and a hole to allow access to the contents of the beverage container when the beverage container lid is coupled to the beverage container. The tray has a tray bottom and walls that define a tray footprint that complements the food container footprint such that the food container can securely nest in the tray. The tray and lid can detachably couple to each other. In other embodiments, the system need not have a separate food container.

35 Claims, 29 Drawing Sheets

(51) Int. Cl.
  *B65D 47/06* (2006.01)
  *B65D 1/34* (2006.01)
  *A47G 19/22* (2006.01)

(52) U.S. Cl.
  CPC ......... *B65D 47/06* (2013.01); *B65D 81/3205* (2013.01); *B65D 2543/00046* (2013.01)

(56) References Cited

U.S. PATENT DOCUMENTS

| | | | | |
|---|---|---|---|---|
| 5,409,126 A * | 4/1995 | DeMars | ............ | B65D 21/0219 206/499 |
| 6,079,586 A | 6/2000 | Hanneman | | |
| 6,338,417 B1 * | 1/2002 | Ferraro | ................. | A47G 19/06 206/217 |
| 6,474,494 B1 * | 11/2002 | Miller | ................. | A47G 19/065 206/217 |
| 6,706,297 B1 | 3/2004 | Toth et al. | | |
| 6,708,735 B1 * | 3/2004 | Kenihan | ............ | B65D 51/2842 141/100 |
| 6,766,902 B1 * | 7/2004 | Hartelius | ............... | B65D 51/28 206/217 |
| 7,832,586 B2 * | 11/2010 | Vovan | ..................... | B65D 1/34 220/23.89 |
| 8,939,312 B1 | 1/2015 | Buck | | |
| 9,038,845 B1 | 5/2015 | Buck | | |
| 9,078,535 B1 | 7/2015 | Buck | | |
| 2009/0057312 A1 * | 3/2009 | Beyers, III | ............ | B65D 51/28 220/254.1 |
| 2011/0284537 A1 * | 11/2011 | Cerasani | .................. | B65D 1/34 220/212 |
| 2013/0228486 A1 * | 9/2013 | Buck | .................. | B65D 21/0238 206/459.1 |
| 2014/0175103 A1 * | 6/2014 | Oh | ....................... | A47G 19/065 220/600 |

OTHER PUBLICATIONS

International Preliminary Report on Patentability dated Apr. 19, 2018 in PCT/US2016/055852 (8 pages).

* cited by examiner

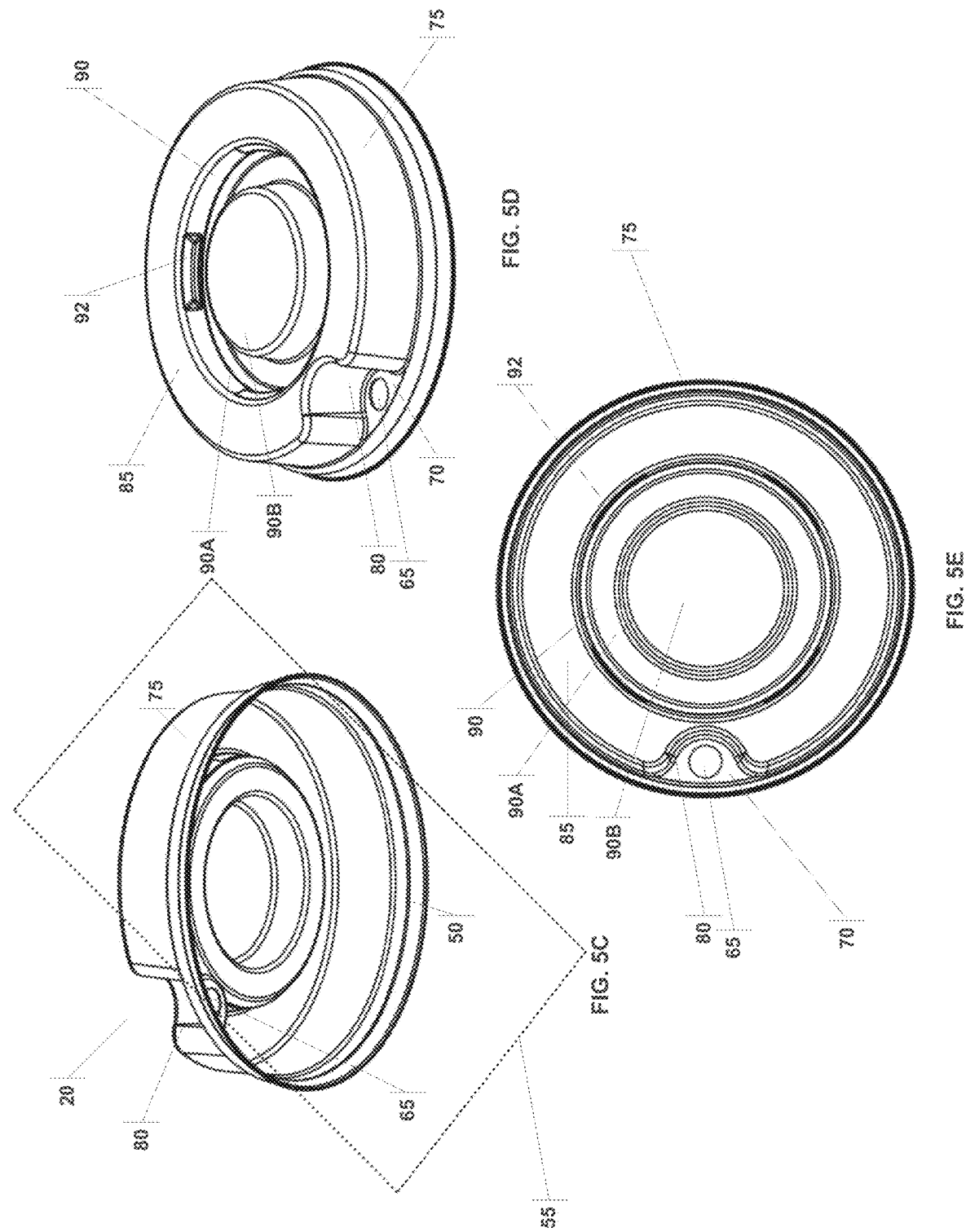

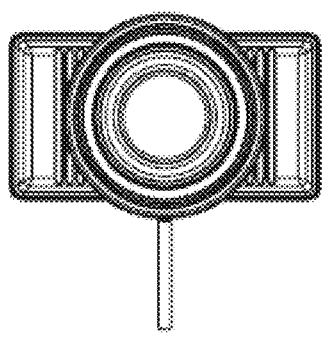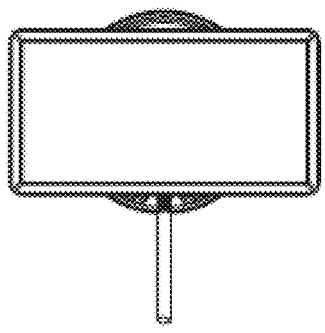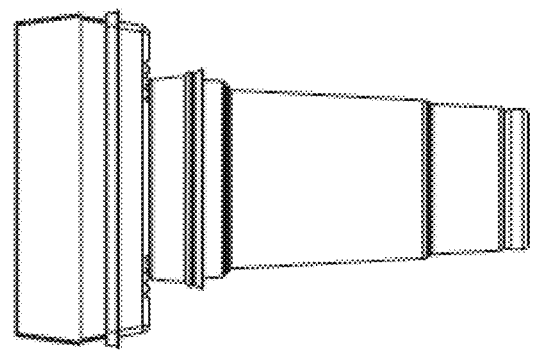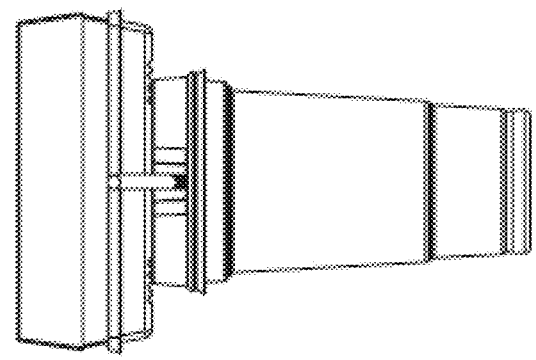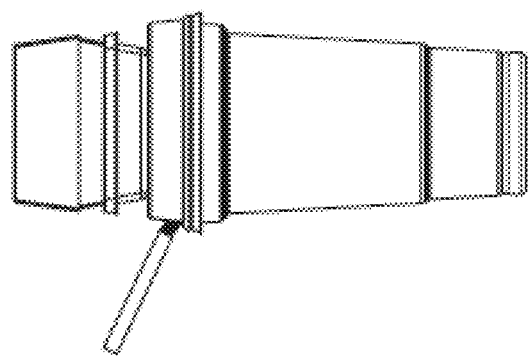

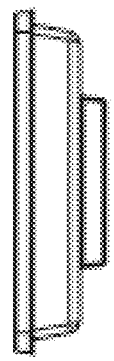
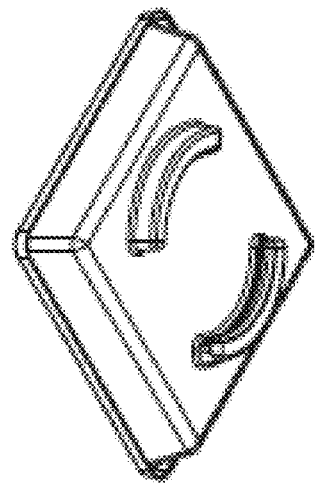
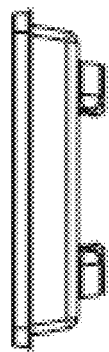
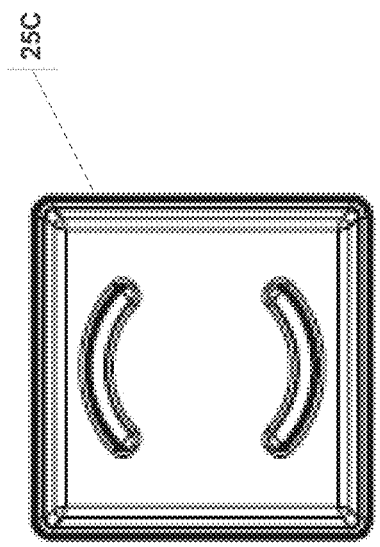
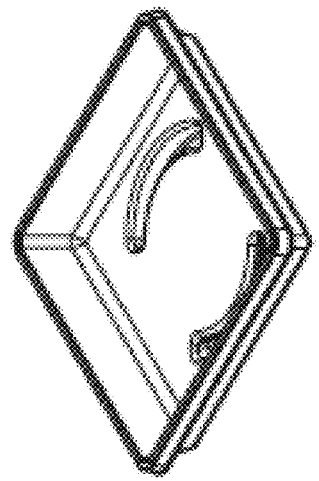

PORTABLE PACKAGING SYSTEM

RELATED APPLICATIONS

This application claims priority to U.S. Patent Application 62/239,485 entitled "TRAY FOR FOOD CONTAINER" filed on Oct. 9, 2015, the contents of which are incorporate herein by reference.

TECHNICAL FIELD

The present invention relates to food containers.

This application is also related to U.S. Pat. No. 8,596,491 entitled "CUP LID WITH INTEGRATED CONTAINER" issued on Dec. 3, 2013; U.S. Pat. No. 8,695,845 entitled "TOP MOUNTING CAN CONTAINER" issued on Apr. 15, 2014; U.S. Pat. No. 8,381,935 entitled "CUP LID WITH INTEGRATED CONTAINER" issued on Feb. 26, 2013; U.S. Pat. No. 8,714,393 entitled "CUP LID WITH INTEGRATED CONTAINER" issued on May 6, 2014; U.S. Pat. No. 8,590,730 entitled "TOP MOUNTING CAN CONTAINER" issued on Nov. 26, 2013; U.S. Pat. No. 8,708,181 entitled "LID WITH INTEGRATED CONTAINER" issued on Apr. 29, 2014; U.S. Pat. No. 8,701,914 entitled "TWO-PART RECYCLABLE CUP" issued on Apr. 22, 2014; U.S. patent application Ser. No. 13/412,602 entitled "TOP MOUNTING BOTTLE CONTAINER" filed on Mar. 5, 2012; U.S. patent application Ser. No. 13/680,011 entitled "CUP LID WITH INTEGRATED CONTAINER" filed on Nov. 17, 2012; U.S. patent application Ser. No. 13/680,049 entitled "CUP LID WITH INTEGRATED CONTAINER" filed on Nov. 17, 2012; U.S. patent application Ser. No. 13/733,153 entitled "CUP LID WITH INTEGRATED CONTAINER" filed on Jan. 3, 2013; U.S. patent application Ser. No. 14/263,993 entitled "LID WITH INTEGRATED CONTAINER" filed on Apr. 28, 2014; U.S. patent application Ser. No. 14/269,016 entitled "A CONTAINER LID WITH ONE OR MORE CAVITIES" filed on May 2, 2014; U.S. patent application Ser. No. 14/274,576 entitled "A CONTAINER LID WITH A FOOD COMPARTMENT AND A SIP-HOLE" filed on May 9, 2014; U.S. patent application Ser. No. 14/313,907 entitled "A CONTAINER LID SYSTEM WITH A LID PORTION AND FOOD CONTAINER PORTION" filed on Jun. 24, 2014; and U.S. Patent Application Ser. 62/005,862 entitled "A CONTAINER LID SYSTEM WITH A LID PORTION AND FOOD CONTAINER PORTION" filed on May 30, 2014; U.S. patent application Ser. No. 29/500,266 entitled "BENDABLE DRINKING STRAW" filed on Aug. 22, 2014; U.S. Patent Application 62/038,209 entitled "BENDABLE SAFETY STRAW" filed on Aug. 16, 2014; U.S. Patent Application 62/105,256 entitled "BENDABLE SAFETY STRAW AND LIDS WITH FOOD COMPARTMENT" filed on Jan. 20, 2015; U.S. Patent Application 62/395,911 entitled "FOOD CONTAINERS, TRAYS AND LIDS" filed on Sep. 16, 2016; U.S. Patent Application 62/239,483 entitled "FOOD CONTAINER WITH PEEL OFF COVER" filed on Oct. 9, 2015, and U.S. patent application Ser. No. 14/986,703 entitled "CUP LID WITH INTEGRATED CONTAINER" filed on Jan. 3, 2016, all of which are by the same inventor of the present application. Each of these applications is incorporated herein by reference.

BACKGROUND OF THE INVENTION

The increased popularity of fast food establishments, coupled with the popularity of consuming food on-the-go, has led to the need for more convenient carrying of food and beverages.

Billions of disposable beverage containers are used every year. Often, those containers are part of a larger meal, and current technology dictates placing a lid on the beverage container, so packing the food and condiments is done using separate and detached containers. This may be satisfactory for a consumer seated at a table. However, when the consumer must eat on-the-go, use of the current technology is problematic. Consider, for example, a consumer who is drinking the beverage and would like to access a French fry and ketchup. The consumer must set aside a beverage, and then use one hand to hold the bag and the other hand to access the ketchup packet, then set aside the bag and use both hands to open the packet, and finally free up one hand to access the fry and dip it into the ketchup. As shown in this example, current technology does not allow for convenient on-the-go eating.

The inventor of the present application has disclosed a food container that couples to a drink lid, addressing some of the problems in the prior art. For example, U.S. Pat. No. 8,596,491 entitled "CUP LID WITH INTEGRATED CONTAINER" issued on Dec. 3, 2013; U.S. Pat. No. 8,381,935 entitled "CUP LID WITH INTEGRATED CONTAINER" issued on Feb. 26, 2013; and U.S. Pat. No. 8,714,393 entitled "CUP LID WITH INTEGRATED CONTAINER" issued on May 6, 2014 disclose such a food container. But even these containers have some shortcomings. First, industry adoption of the prior lid-coupling food containers will be slow because they are not compatible with existing non-lid-coupling containers; thus, fast food restaurants would bear a great expense in either maintaining two types of food containers (lid-coupling and non-lid-coupling) on hand or replace all the food containers with the new lid-coupling design. Second, because of their complicated structures, the prior lid-coupling food containers are made of plastics, which are not as environmentally friendly as paper. Indeed, many fast food chains have converted from environmentally damaging Styrofoam® containers, and the like, to paper containers in an effort to address this concern. For food establishments that currently use paper or cardboard containers, reverting back to solid plastic containers may meet resistance.

What is therefore needed is a lid that overcomes these shortcomings and fosters convenient on-the-go eating.

SUMMARY OF THE INVENTION

The present invention provides an elegant solution to the needs described above and provides numerous additional benefits and advantages, as will be apparent to persons of skill in the art. A portable packaging system is disclosed and claimed that includes a food container, a beverage container lid and a tray. The food container has a bottom, a wall extending from the bottom, and a defined food container footprint. The lid has a rim coupling structure that detachably couples to the rim of a beverage container and a hole to allow access to the contents of the beverage container when the beverage container lid is coupled to the beverage container. The tray has a tray bottom and walls that define a tray footprint that complements the food container footprint such that the food container can securely nest in the tray. The tray and lid can detachably couple to each other.

To maintain a securely nested food container, the tray wall is preferably 25%-75% as tall as the food container wall. The tray wall may also include tray wall bump-outs that apply pressure to the side walls of the food container.

To assist in accessing the contents of the beverage container, the rim coupling structure may define a rim plane, and the beverage container lid includes a hole planar surface that extends from the rim coupling structure in substantially the same plane as the rim plane. The hole planar surface may include the hole. Furthermore, the beverage container lid may include a riser wall that extends upward from the rim coupling structure and an upper planar surface may extend from the beverage container lid riser wall, wherein the upper planar surface comprises the complementary tray coupling structure. The height of the beverage container lid riser wall may be sufficient to allow a straw to access the contents of the beverage container through the hole, when the tray is coupled to the beverage container lid. The beverage container lid riser wall may also include a cutout and a hole planar surface with a hole that is connected to the beverage container lid riser wall at the cutout.

The tray bottom may include strengthening ribs.

The tray wall may also have a first portion that extends vertically away from the tray bottom and a second portion that extends vertically towards the tray bottom, wherein a top rim wall connects the first and second tray wall portions to form a strengthened tray rim structure.

The food container may be constructed of paper, cardboard, pulp, or other biodegradable material, and the tray may be additionally constructed of non-paper. The food container can also have a lid. The shape of the food container footprint could be square, rectangular or circular.

The complementary tray coupling structure of the beverage container lid may include a bump-out, and the tray coupling structure may include a bump-in, wherein the bump-out is complementary to the bump-in, and the bump-out deflects when the tray is mated to the beverage container lid.

In other embodiments, the portable packaging system need not have a separate food container, but it may be comprised of a tray and a beverage container lid.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 5C is a bottom perspective view of the beverage container lid of the portable packaging system of FIG. 1, illustrating various features of the lid.

FIG. 5D is a top perspective view of the beverage container lid of the portable packaging system of FIG. 1, illustrating various features of the lid.

FIG. 5E is a top view of the beverage container lid of the portable packaging system of FIG. 1.

FIG. 16A is a top view showing the portable packaging system of FIG. 10, wherein the tray is detachably coupled to the lid of a beverage container with a food container nested in the tray.

FIG. 16B is a bottom view showing the portable packaging system of FIG. 10, wherein the tray is detachably coupled to the lid of a beverage container with a food container nested in the tray.

FIG. 16C is a side view showing the portable packaging system of FIG. 10, wherein the tray is detachably coupled to the lid of a beverage container with a food container nested in the tray.

FIG. 16D is a back view showing the portable packaging system of FIG. 10, wherein the tray is detachably coupled to the lid of a beverage container with a food container nested in the tray.

FIG. 16E is a front view showing the portable packaging system of FIG. 10, wherein the tray is detachably coupled to the lid of a beverage container with a food container nested in the tray.

FIG. 22A is a top view of the tray of FIG. 20.

FIG. 22B is a front view of the tray of FIG. 20.

FIG. 22C is a side view of the tray of FIG. 20.

FIG. 22D is a top perspective view of the tray of FIG. 20.

FIG. 22E is a bottom perspective view of the tray of FIG. 20.

DETAILED DESCRIPTION

Figures 1, 2:
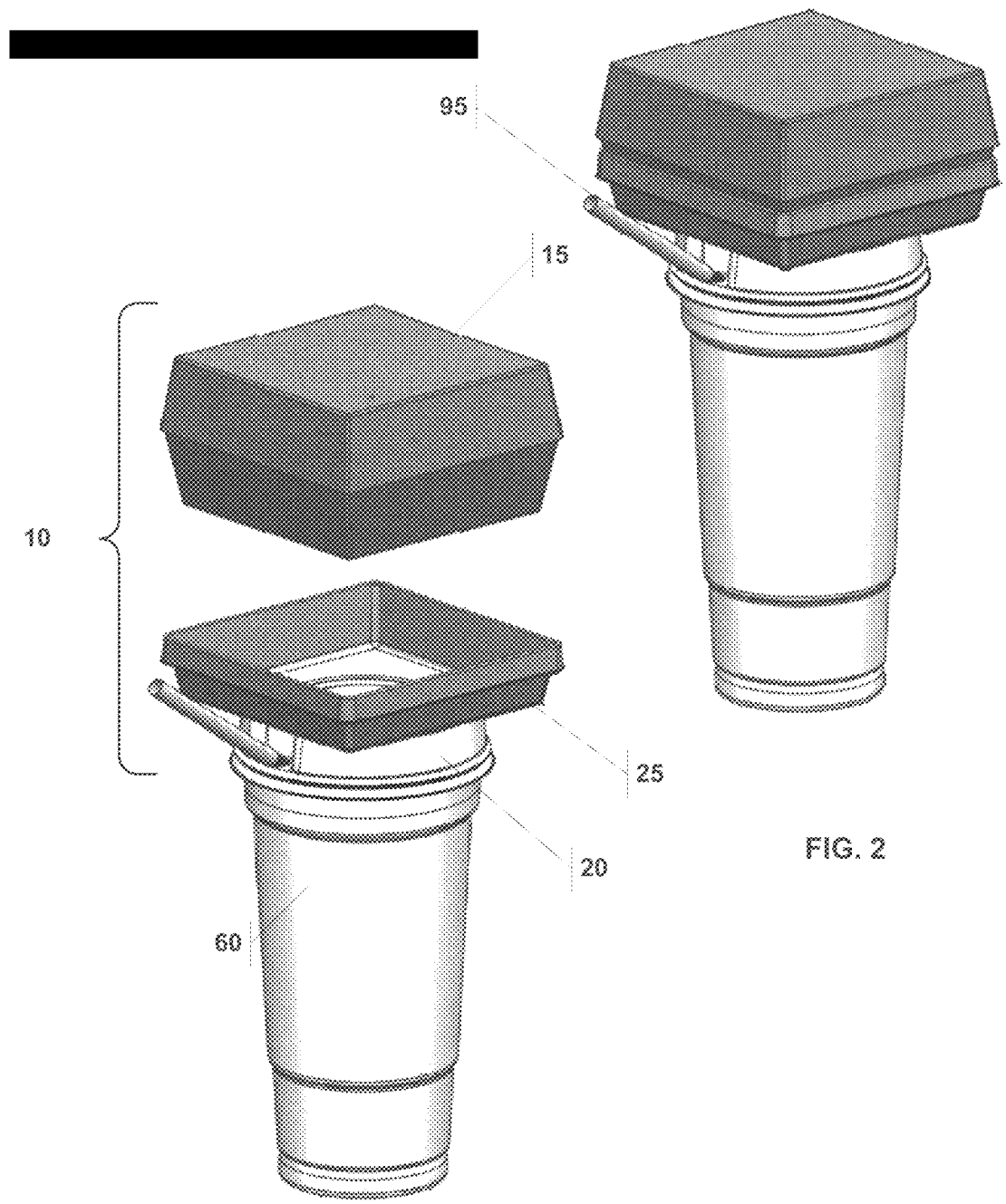
FIG. 1 illustrates a first embodiment of portable packaging system where a tray is detachably coupled to the lid of a beverage container, and the tray is dimensioned to receive a food container with a square footprint.
FIG. 2 illustrates the portable packaging system of FIG. 1, with the food container nested in the tray.
Figure 3:
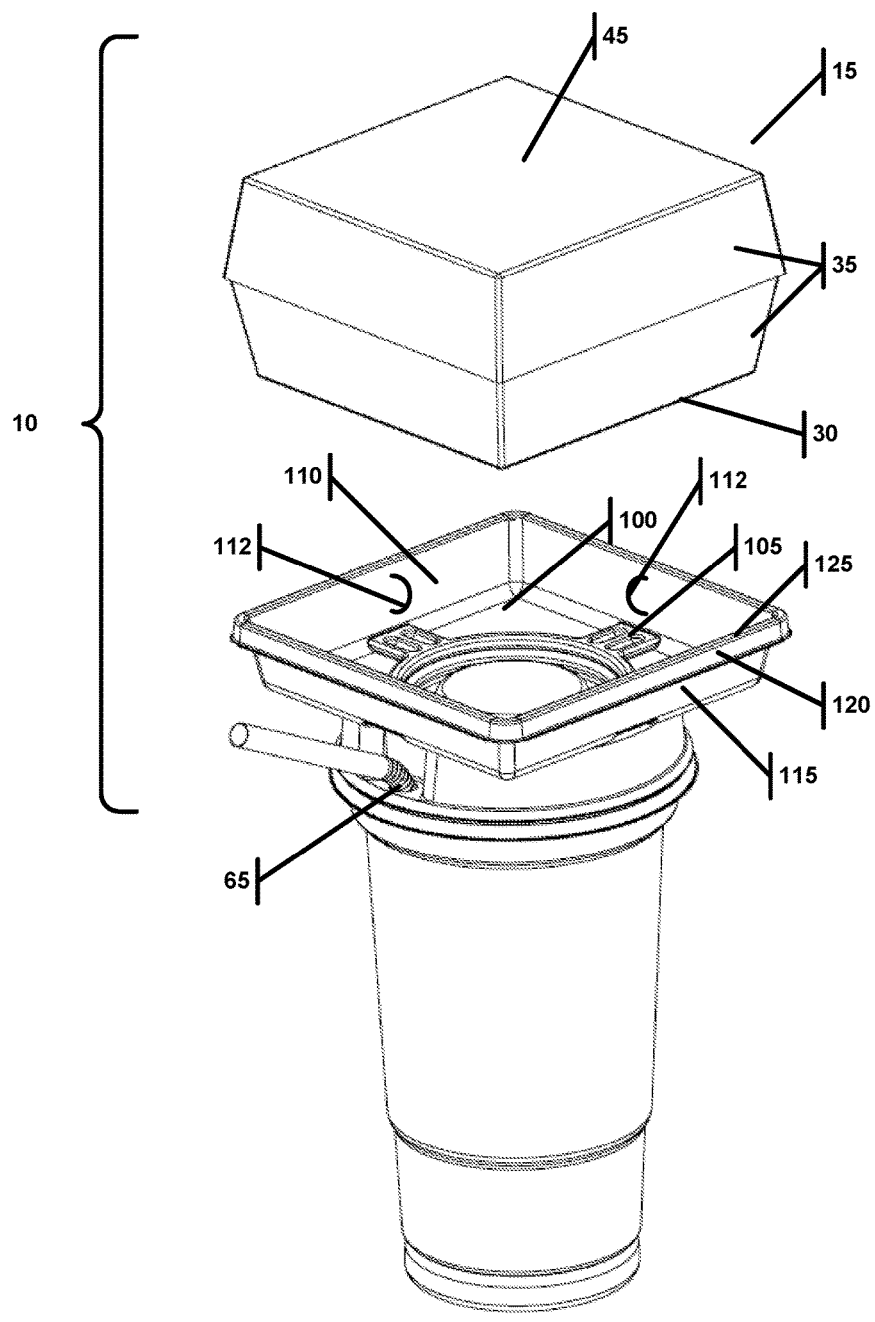
FIG. 3 is a top perspective view of the portable packaging system of FIG. 1, wherein the tray is detachably coupled to the lid of a beverage container and the food container is not nested in the tray.
Figure 4B:
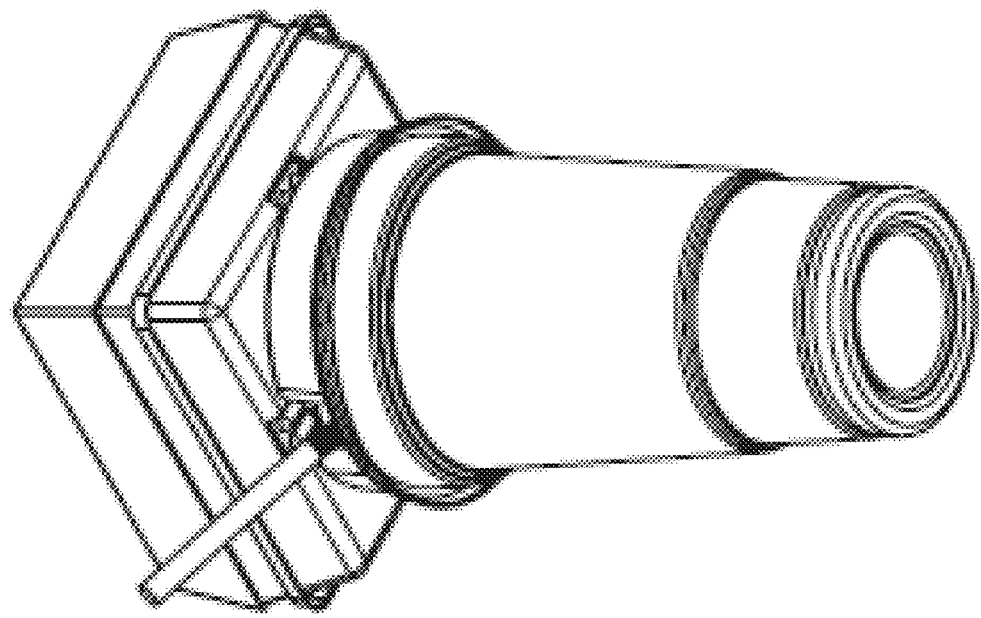
FIG. 4B is a bottom perspective view of the portable packaging system of FIG. 1 wherein the tray is detachably coupled to the lid of a beverage container with a food container nested in the tray.
Figure 4A:
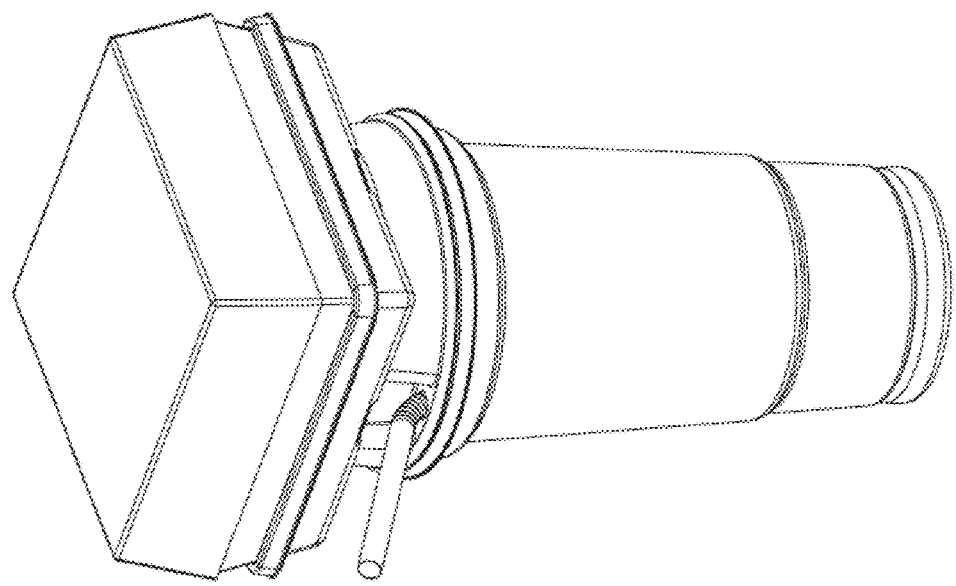
FIG. 4A is a top perspective view of the portable packaging system of FIG. 1, wherein the tray is detachably coupled to the lid of a beverage container with a food container nested in the tray.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated or may not be performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-27D and is provided for ease of reference, where like reference numerals designate corresponding features throughout the specification and figures:

Square portable packaging system 10
Rectangular portable packaging system 10B
Square portable packaging system (male lid coupling) 10C
Rectangular portable packaging system (male lid coupling) 10D
Square food container 15
Rectangular food container 15B
Beverage container lid 20
Beverage container lid (male coupling) 20B
Square tray 25
Rectangular tray 25B
Square tray (male lid coupling) 25C
Rectangular tray (male lid coupling) 25D
Circular tray 25E
Inverted truncated pyramid tray 25F
Food container wall 35
Food container footprint 40
Food container lid 45
Rim coupling structure 50
Rim plane 55
Beverage container 60
Hole 65
Hole planar surface 70
Beverage container lid riser wall 75
Cutout 80
Upper planar surface 85
Complementary tray coupling structure 90
Channel 90A
Post 90B
Bump-outs 92
Straw 95
Tray bottom 100
Strengthening ribs 105
Tray wall 110
Tray wall bump-outs 112
First portion of tray wall 115
Second portion of tray wall 120
Top rim wall/strengthened tray rim 125
Tray footprint 130
Tray coupling structure 135
Bump-ins 140
Post 145
Space 150
Portable packaging system (circular tray) 155
Portable packaging system (Inverted truncated pyramid tray) 160

Figures 10, 11:
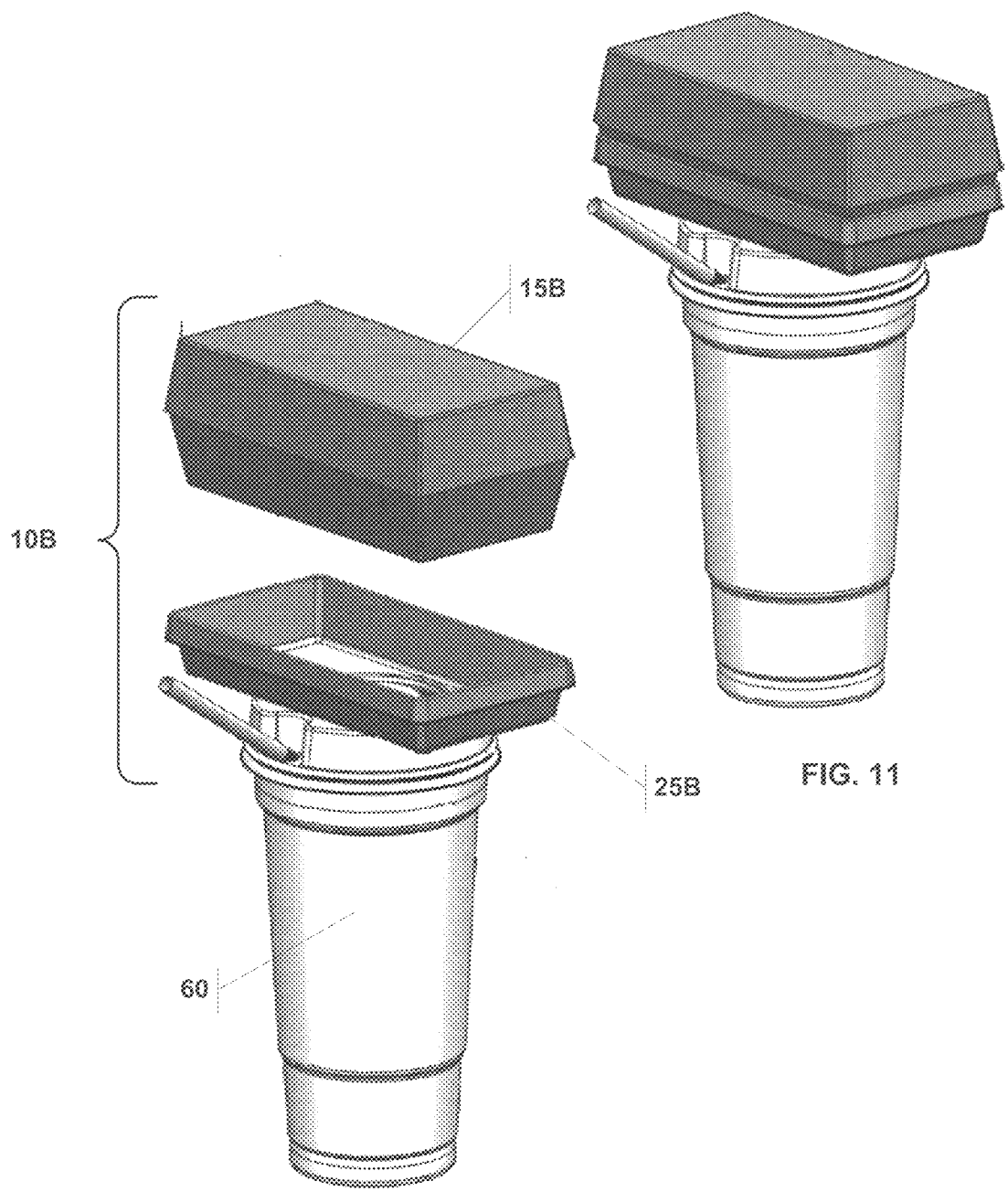
FIG. 10 illustrates a second embodiment of portable packaging system where a tray is detachably coupled to the lid of a beverage container, and the tray is dimensioned to receive a food container with a rectangular footprint.
FIG. 11 illustrates the portable packaging system of FIG. 10, with the food container nested in the tray.
Figure 12:
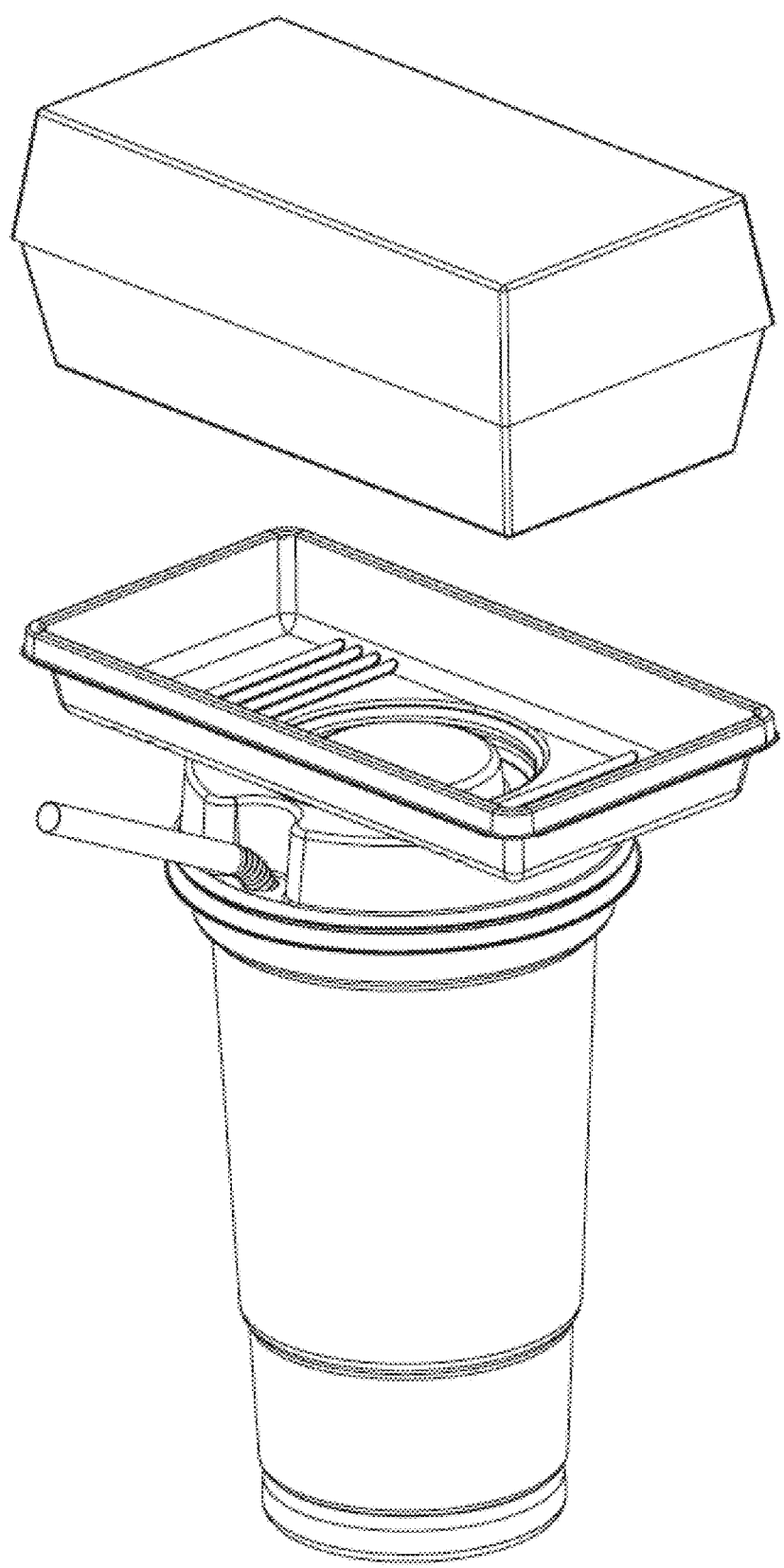
FIG. 12 is a top perspective view of the portable packaging system of FIG. 10, wherein the tray is coupled to the lid of a beverage container, and the food container is not nested in the tray.
Figure 13B:
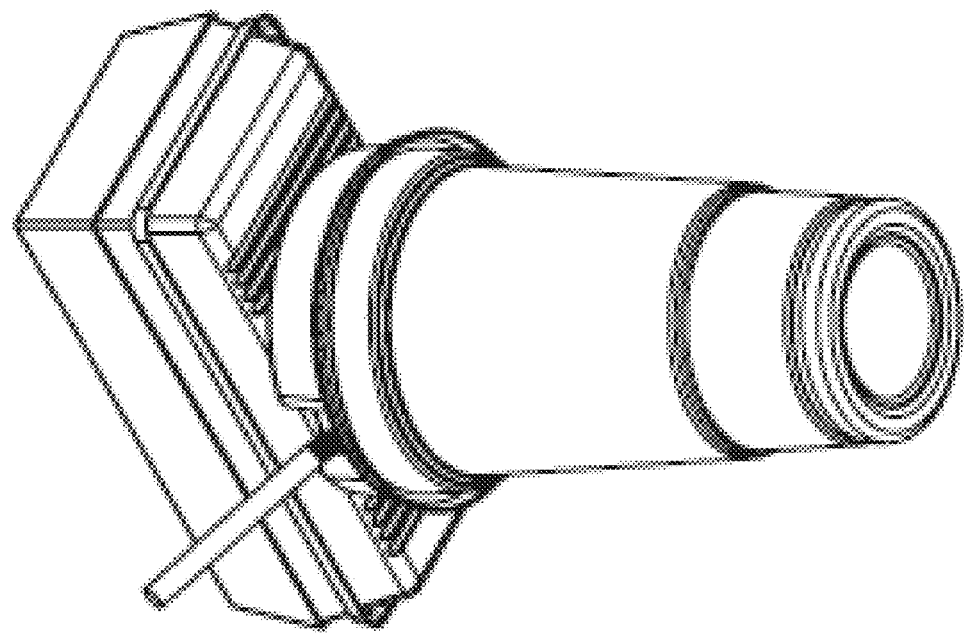
FIG. 13B is a bottom perspective view of the portable packaging system of FIG. 10 wherein the tray is detachably coupled to the lid of a beverage container with a food container nested in the tray.
Figure 13A:
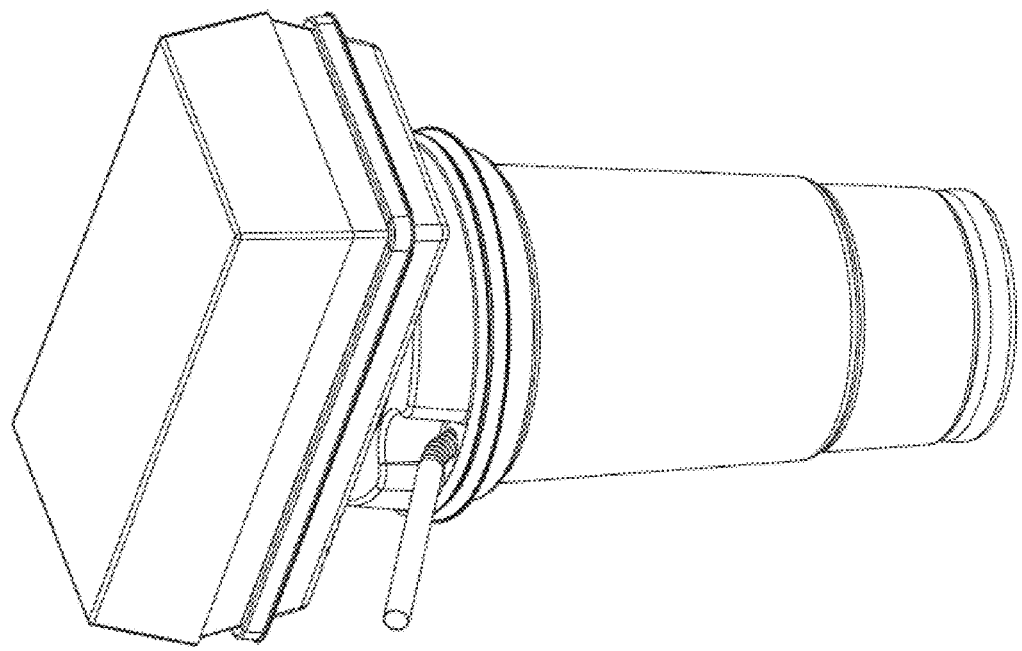
FIG. 13A is a top perspective view of the portable packaging system of FIG. 10, wherein the tray is detachably coupled to the lid of a beverage container with a food container nested in the tray.
Figure 14A:
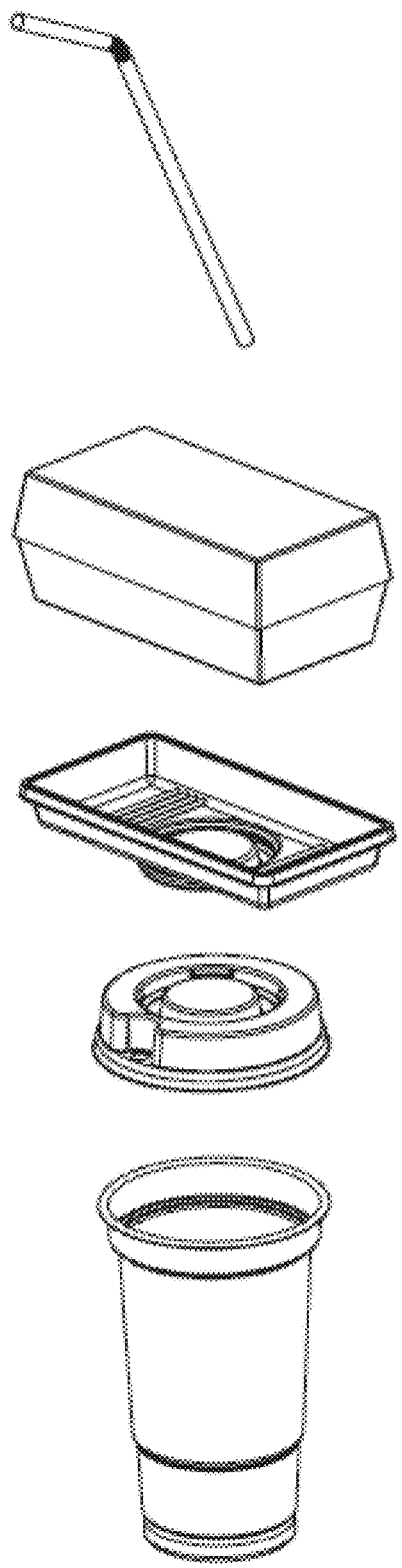
FIG. 14A is a top perspective exploded view showing the portable packaging system of FIG. 10.
Figure 14B:
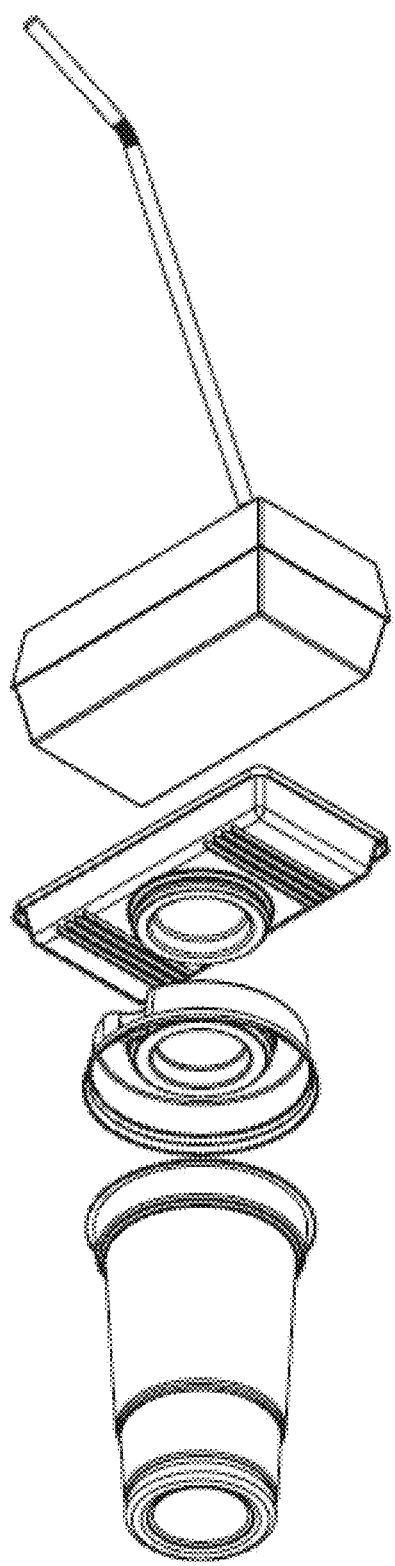
FIG. 14B is a bottom perspective exploded view showing the portable packaging system of FIG. 10.
Figure 15:
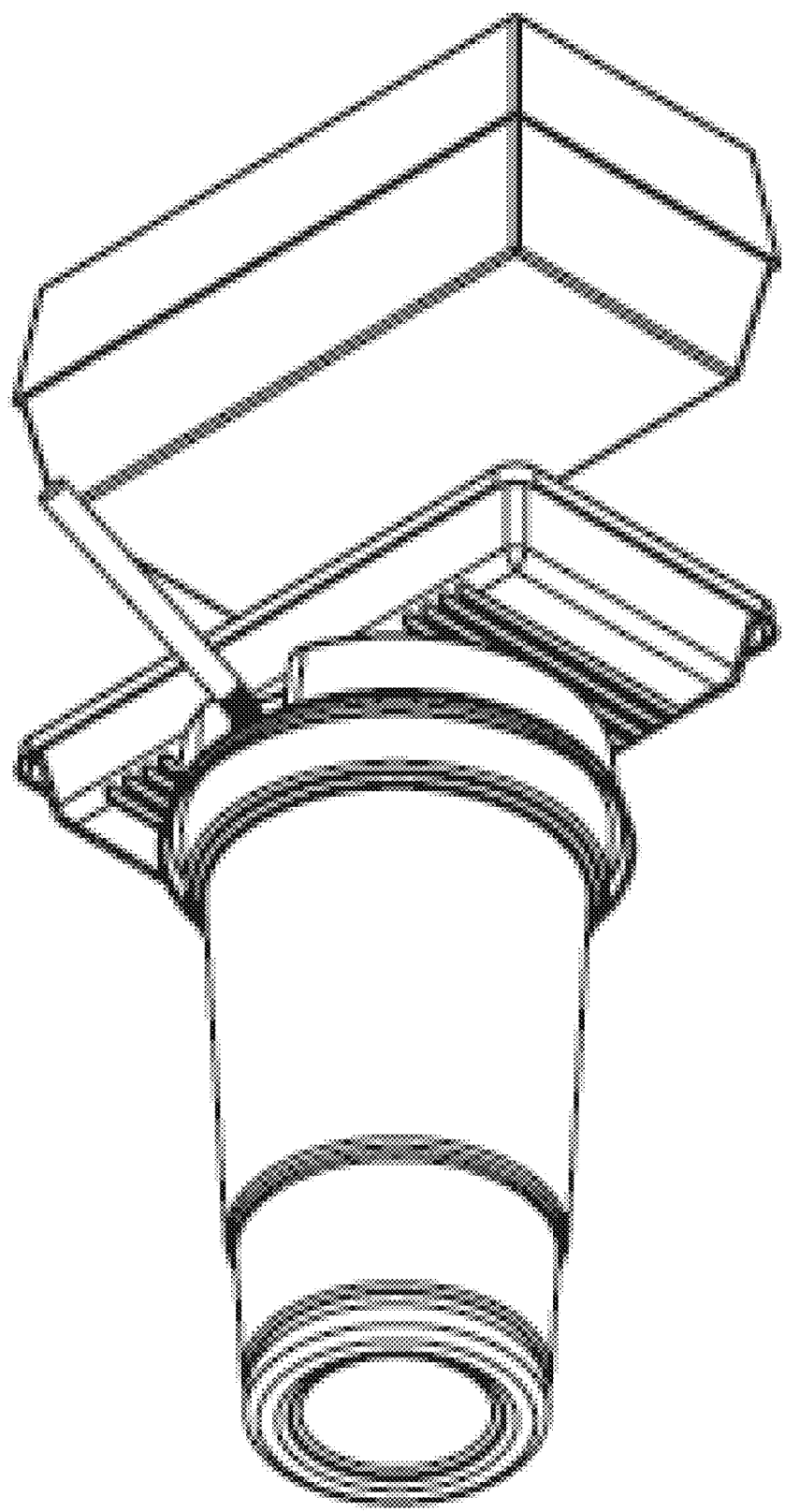
FIG. 15 is a bottom perspective view of the portable packaging system of FIG. 10, wherein the tray is coupled to the lid of a beverage container and the food container is not nested in the tray.
Figure 17A:
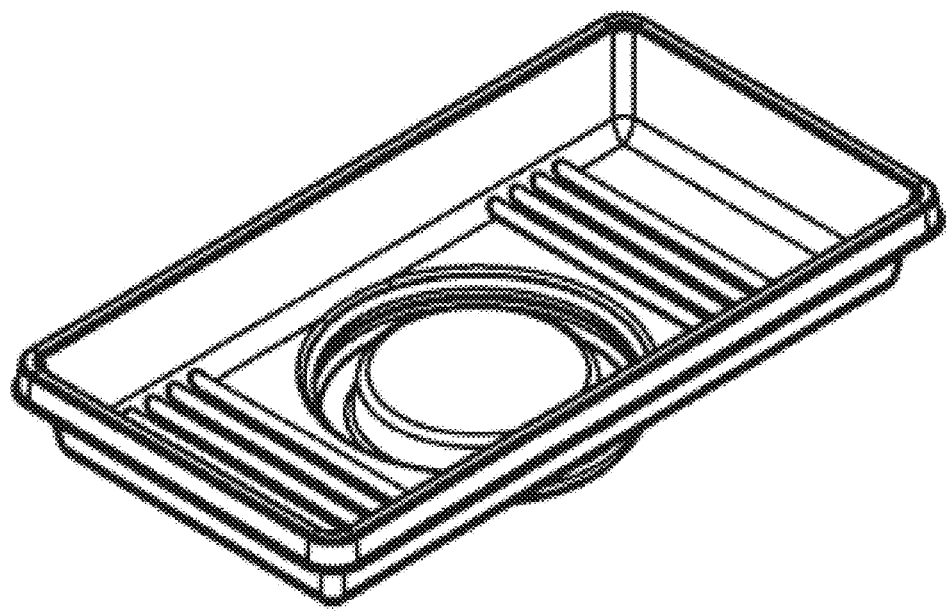
FIG. 17A is a top perspective view of the tray of FIG. 10.
Figure 17B:
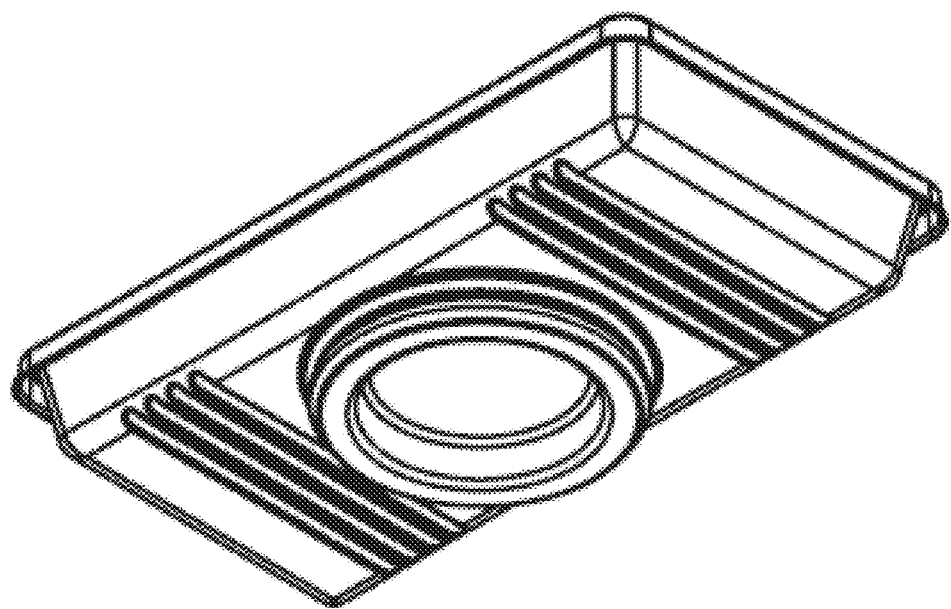
FIG. 17B is a bottom perspective view of the tray of FIG. 10.
Figure 18A:
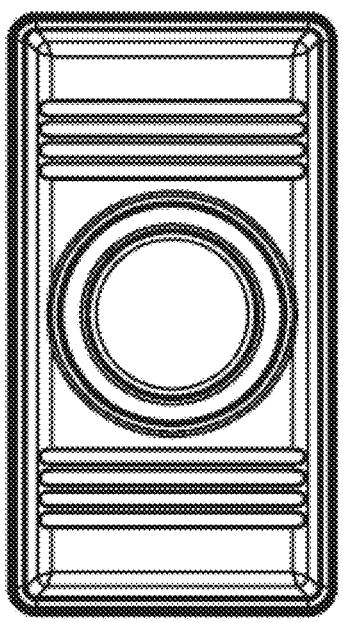
FIG. 18A is a top view of the tray of FIG. 10.
Figure 18B:
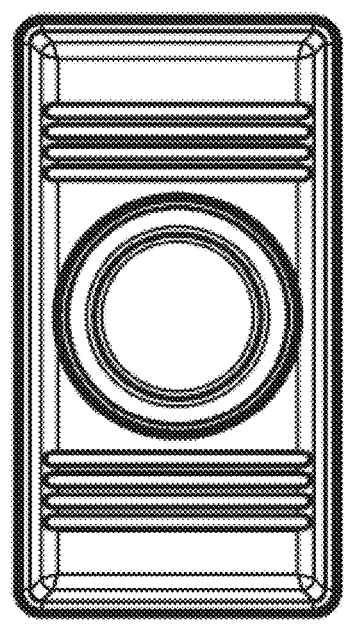
FIG. 18B is a bottom view of the tray of FIG. 10.
Figure 18C:
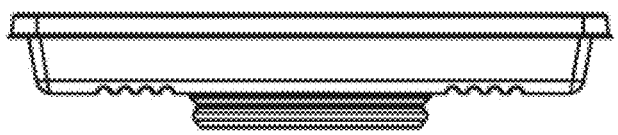
FIG. 18C is a front view of the tray of FIG. 10.
Figure 18D:
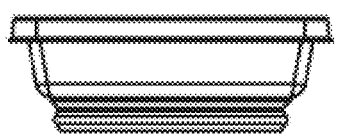
FIG. 18D is a side view of the tray of FIG. 10.

FIG. 1 illustrates a first embodiment of a portable packaging system 10 that includes a tray 25 that can detachably couple to the beverage container lid 20 of a beverage container 60, and the tray 25 is dimensioned to receive a food container 15 with a square footprint. FIGS. 2-9C illustrate the first embodiment of the portable packaging system 10 from different perspectives for fast serve use. FIG. 10 illustrates a second embodiment of a portable packaging system 10B including a tray 25B that can detachably couple to the beverage container lid 20 of a beverage container 60, and the tray 25B is dimensioned to receive a food container 15B with a rectangular footprint. FIGS. 11-18D illustrate the second embodiment of the portable packaging system 10B from different perspectives for fast serve use. The first embodiment referencing FIGS. 1-9C will be detailed below and the same detailed structures can be adapted to the second embodiment (i.e., FIG. 10-18D). Likewise, the same structures can be applied to the third and further embodiments shown in FIGS. 19A-25E.

The teaching and disclosure herein may also be used without a food container; rather the tray itself serves as the volume in which food may be held. This is shown in FIGS. 26A-26D (a circular tray) and FIGS. 27A-27D (an inverted truncated pyramid tray).

6.1 A Portable Packaging System that Includes a Separate Food Container

Referring to FIGS. 1-9C, a portable packaging system 10 is shown that includes a square food container 15, a beverage container lid 20 and a square tray 25. The food container 15 has a bottom 30 and a wall 35 extending from bottom 30, and the wall 35 defines a food container footprint 40. The food container 15 may be constructed of paper, cardboard, pulp or other biodegradable material. The food container 15 can also have a food container lid 45 and a hinge (no shown) to form a clamshell type of container. The shape of the food container footprint could be square (FIGS. 1-9C), rectangular (FIGS. 10-18D), circular or any other appropriate shape.

Figure 5A:
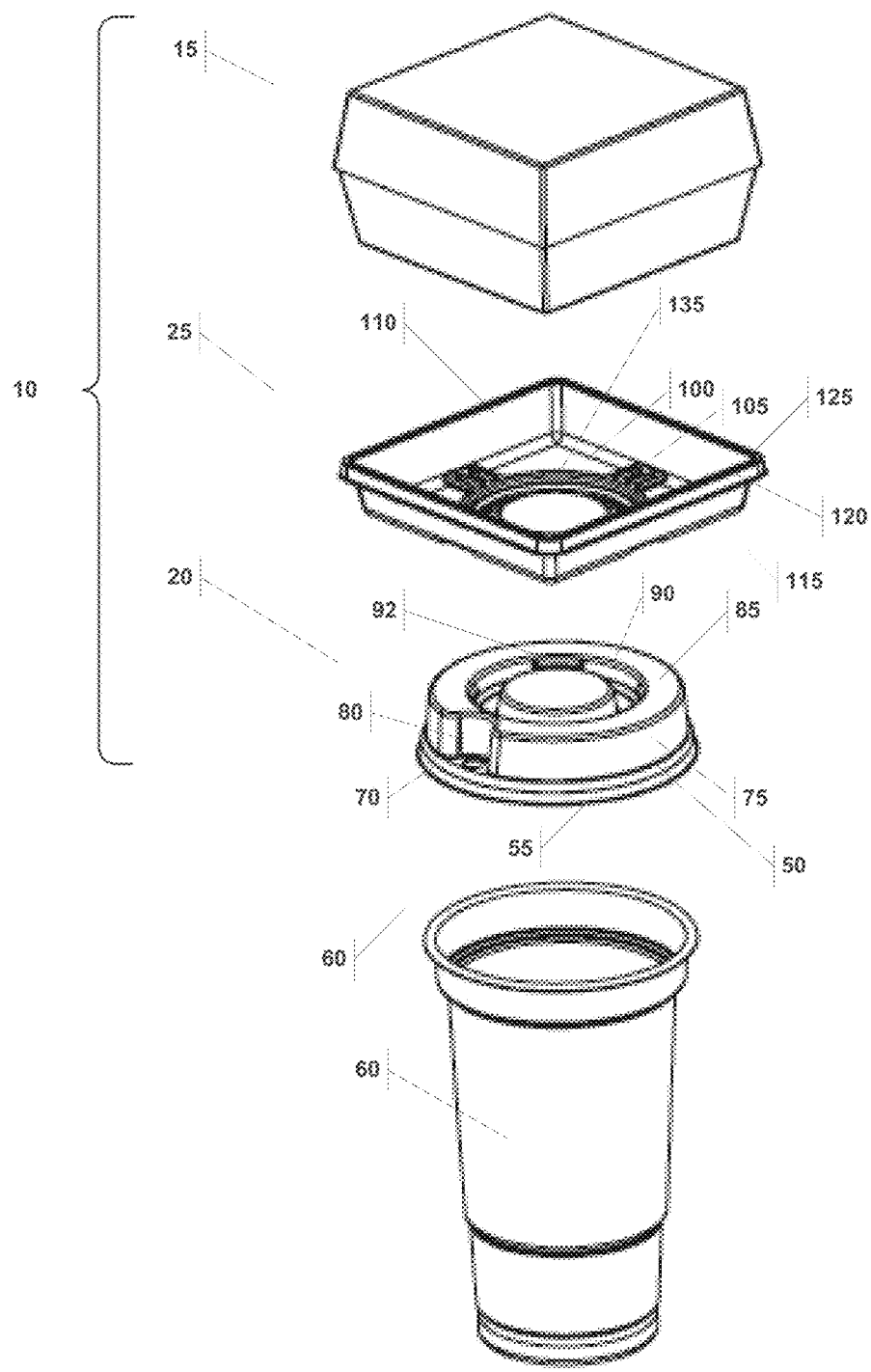
FIG. 5A is a top perspective exploded view showing the portable packaging system of FIG. 1.
Figure 5B:
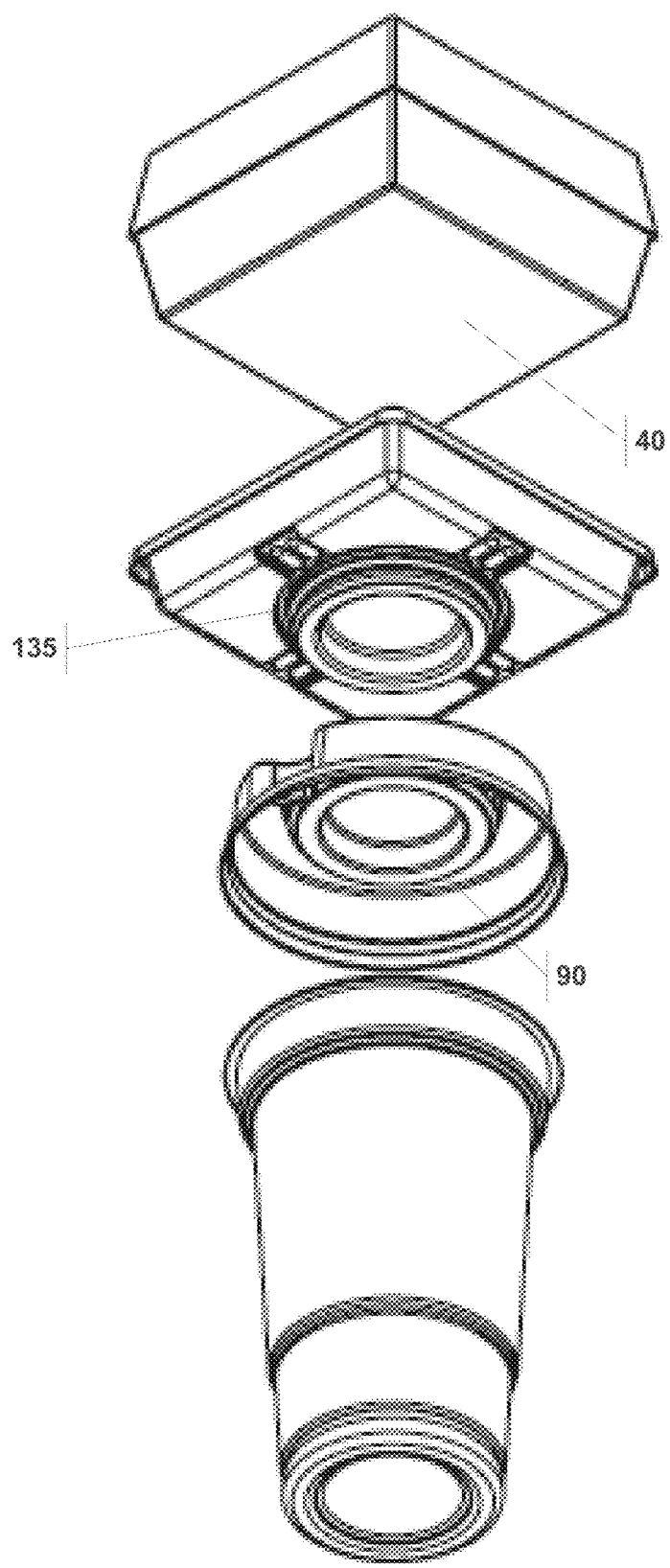
FIG. 5B is a bottom perspective exploded view showing the portable packaging system of FIG. 1.
Figure 6:
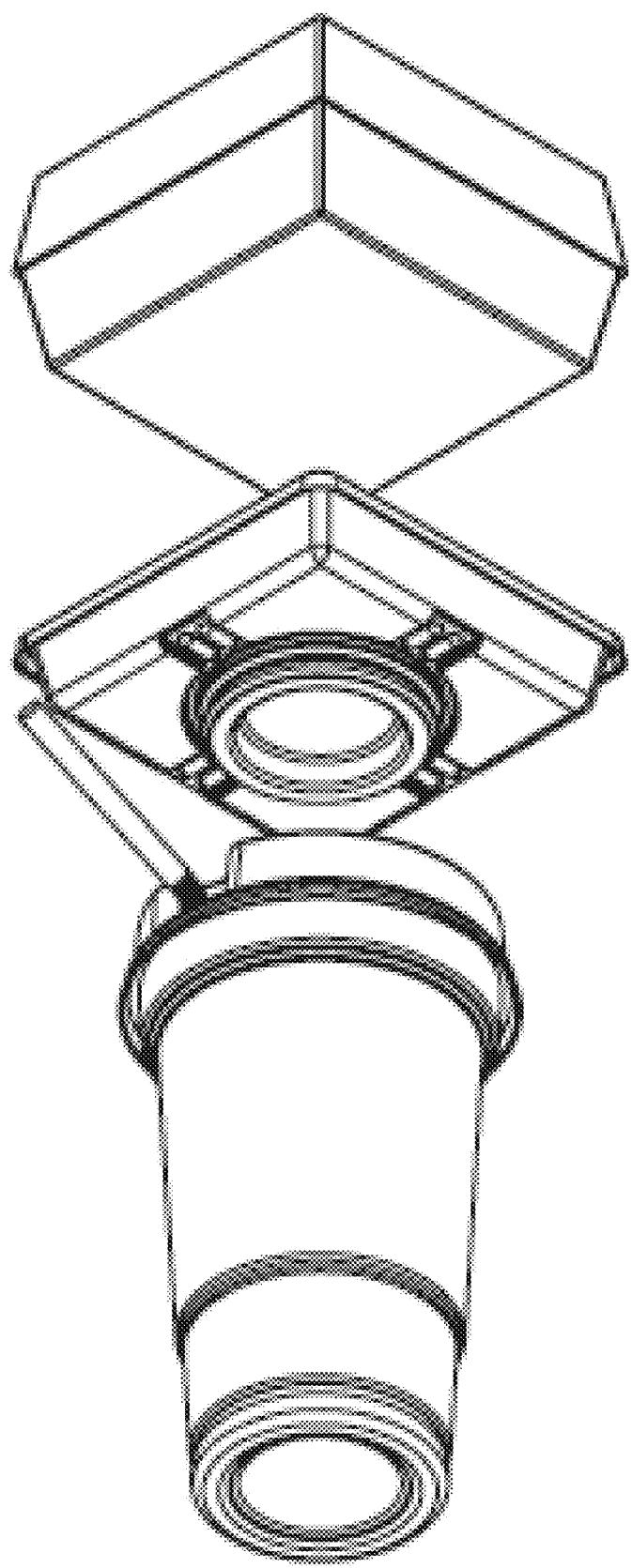
FIG. 6 is a bottom perspective view of the portable packaging system of FIG. 1, wherein the tray is coupled to the lid of a beverage container, and the food container is not nested in the tray.
Figure 7E:
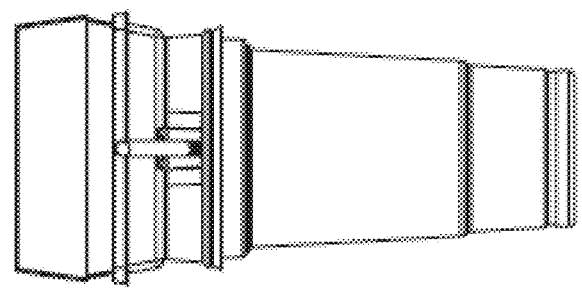
FIG. 7E is a front view showing the portable packaging system of FIG. 1, wherein the tray is detachably coupled to the lid of a beverage container with a food container nested in the tray.
Figure 7B:
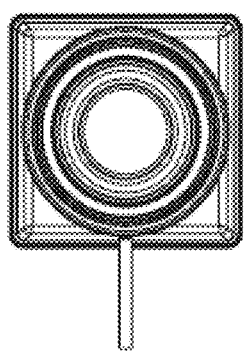
FIG. 7B is a bottom view showing the portable packaging system of FIG. 1, wherein the tray is detachably coupled to the lid of a beverage container with a food container nested in the tray.
Figure 7D:
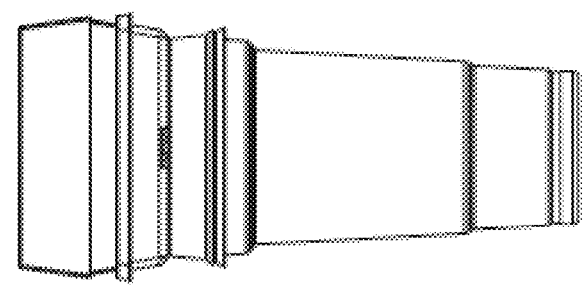
FIG. 7D is a back view showing the portable packaging system of FIG. 1, wherein the tray is detachably coupled to the lid of a beverage container with a food container nested in the tray.
Figure 7A:
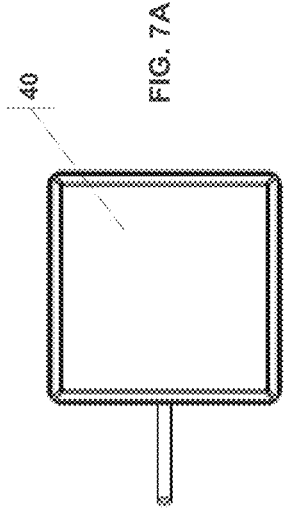
FIG. 7A is a top view showing the portable packaging system of FIG. 1, wherein the tray is detachably coupled to the lid of a beverage container with a food container nested in the tray.
Figure 7C:
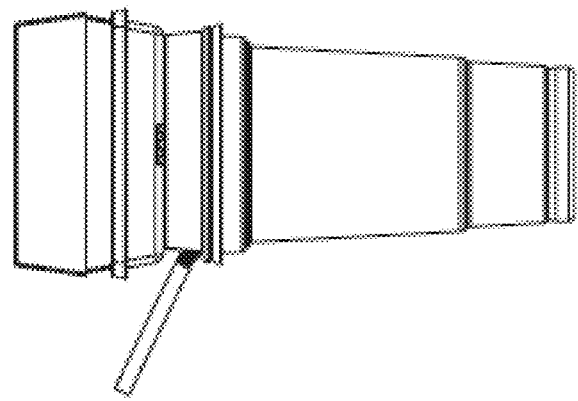
FIG. 7C is a side view showing the portable packaging system of FIG. 1, wherein the tray is detachably coupled to the lid of a beverage container with a food container nested in the tray.
Figure 8A:
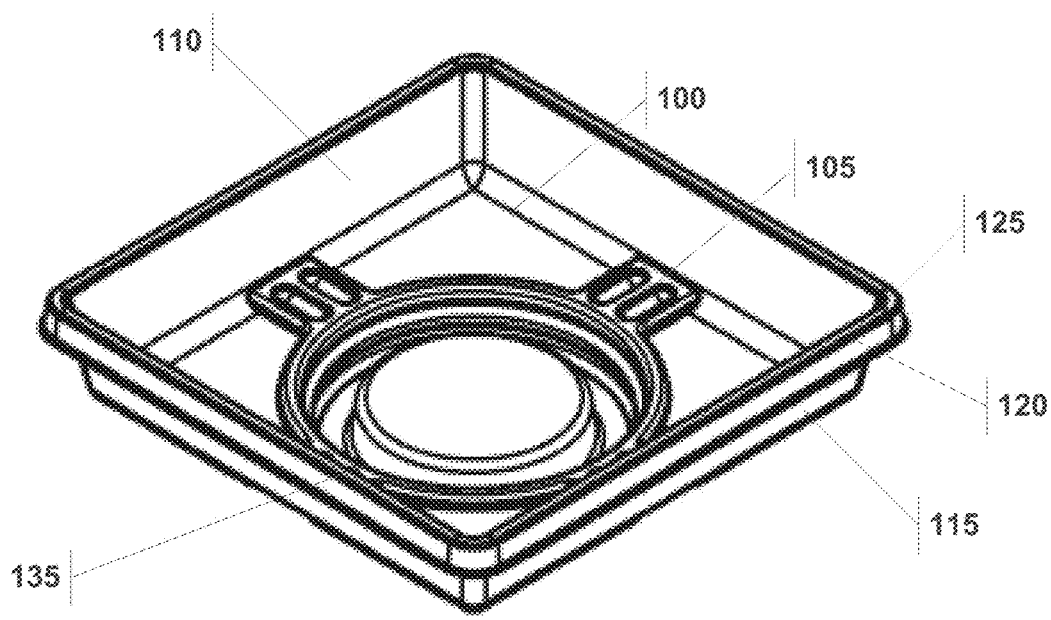
FIG. 8A is a top perspective view of the tray of FIG. 1.
Figure 8B:
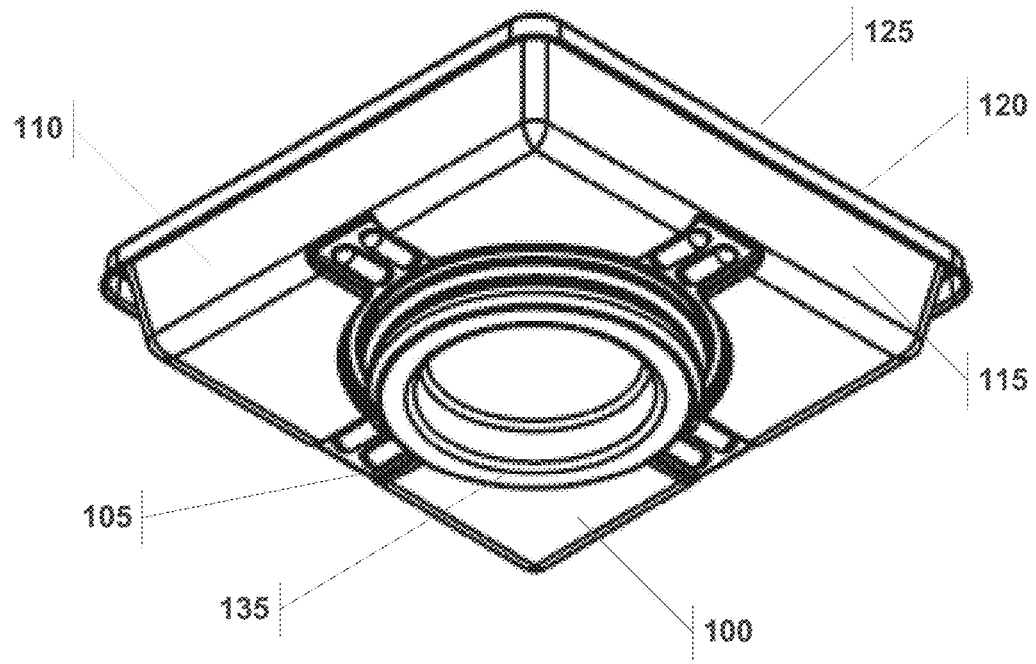
FIG. 8B is a bottom perspective view of the tray of FIG. 1.
Figure 9B:
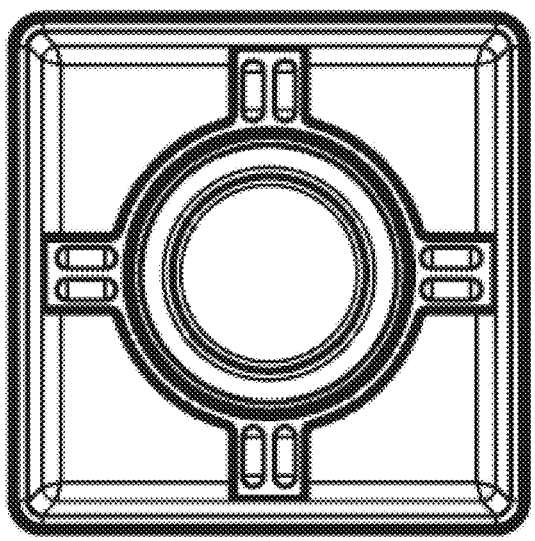
FIG. 9B is a bottom view of the tray of FIG. 1.
Figure 9C:
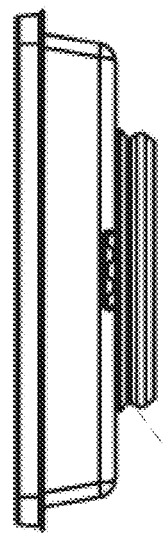
FIG. 9C is a side view of the tray of FIG. 1.
Figure 9A:
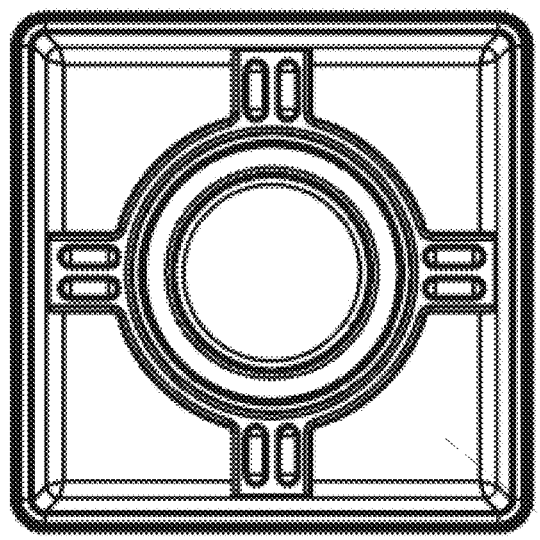
FIG. 9A is a top view of the tray of FIG. 1.

As shown in greater detail in FIGS. 5C-5E, the beverage container lid 20 has a rim coupling structure 50 that detachably couples to the rim of a beverage container 60 and a hole 65, to allow access to the contents of the beverage container 60 when the beverage container lid 20 is coupled to the beverage container 60. To assist in accessing the contents of the beverage container 60, the rim coupling structure 50 may define a rim plane 55, and the beverage container lid 20 further includes a hole planar surface 70 that extends from the rim coupling structure 50 in substantially the same plane as the rim plane 55. The hole planar surface 70 may include the hole 65. Furthermore, the beverage container lid riser wall 75 may extend upwardly away from the rim coupling structure 50 and an upper planar surface 85 may extend from the beverage container lid riser wall 75, wherein the upper planar surface 85 comprises the complementary tray coupling structure 90 (here the coupling structure is shown as a channel 90A and a post 90B; such a configuration helps maintain the stability of the tray when it is coupled). The height of the beverage container lid riser wall 75 may be sufficient to allow a straw to access the contents of the beverage container 60 through the hole 65, without interfering with the bottom outer corner of the tray 25 or food container 15 when the tray 25 is coupled to the beverage container lid 20. The beverage container lid riser wall 75 may also include a cutout 80 and the hole planar surface 70 that is connected to the beverage container lid riser wall 75 at the cutout 80.

The tray 25 has a tray bottom 100 and tray walls 110 that define a tray footprint 130 that complements the food container footprint 40 such that the food container 15 can securely nest in the tray 25. The tray 25 and the beverage container lid 20 can detachably couple to each other. The tray bottom 100 may include strengthening ribs 105, as may the tray wall 110. The tray wall 110 may also have a first portion 115 that extends vertically away from the tray bottom 100 and a second portion 120 that extends vertically towards the tray bottom 110, wherein a rim wall between the first and second tray wall portions forms a strengthened tray rim 125, which adds rigidity to the tray structure.

The complementary tray coupling structure 90 of the beverage container lid 20 may include a bump-out 92, and the tray coupling structure 135 may include a bump-in 140 (FIG. 9), or another pair of complementary structures, wherein the bump-out 92 is complementary to the bump-in 140, and the bump-out 92 deflects when the tray 25 is mated to the beverage container lid 20. The bump-in 140 may also deflect, and either or both of the bump-out 92 and/or the bump-in 140 may place pressure on each other to the maintain a solid connection between the beverage container lid 20 and the tray 25.

To maintain a securely nested food container 25, the tray wall 110 is preferably 25%-75% as tall as the food container wall 35, and the tray 25 wall may also include a tray wall bump-out 112 that applies pressure to the food container 15.

The benefit of this tray is that it can be introduced into an existing line of product packaging and works with that line of packaging. This offers a new way to deliver food to the customer without carrying two completely different lines of food containers. For example, one customer may not be eating the food on-the-go but may take the food home and, as a consequence, does not need to use the tray but still needs the food container. A second customer may be eating on-the-go and may need the tray. The restaurant can accommodate both customers by simply providing the tray to one, while using the same food container for both.

Use of the tray also has the benefit of being more green. Over the past several years, many restaurants have converted their food containers from Styrofoam® to biodegradable paper products in response to environmental concerns. Using the tray allows a restaurant to continue using the paper products in which they have heavily invested. Moreover, the tray may be made of a compostable PLA plastic, which uses two thirds less plastic than a common clamshell plastic container.

The tray may be coupled to the lid of a beverage container. Such a lid is described in U.S. patent application Ser. No. 14/313,907 entitled "A CONTAINER LID SYSTEM WITH A LID PORTION AND FOOD CONTAINER PORTION" filed on Jun. 24, 2014 and U.S. patent application Ser. No. 14/986,703 entitled "CUP LID WITH INTEGRATED CONTAINER" filed on Jan. 3, 2016. Another such beverage container lid is shown in U.S. Pat. No. D767391 entitled "BEVERAGE CONTAINER LID" issued on Sep. 27, 2016. These patent and patent applications are by the same inventor of the present application, and both are incorporated by reference here. Other examples of coupling lids are described in the patent applications listed at the beginning of this provisional application, all of which are incorporated by reference.

The structures just described with regards to the first embodiment (i.e., FIGS. 1-9C) can be applied to the second embodiment shown in FIGS. 10-18D illustrating a rectangular tray. Other tray shapes can be used to accommodate food containers of different shapes.

Figure 19B:
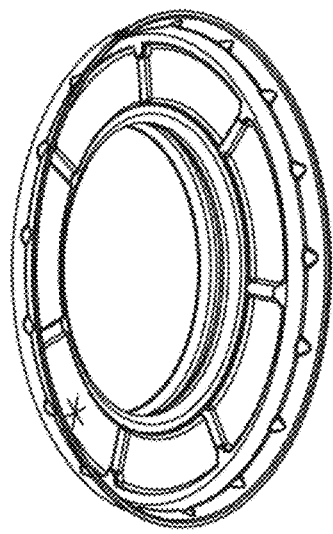
FIG. 19B is a bottom perspective view of the beverage container lid of FIG. 19A.
Figure 19C:
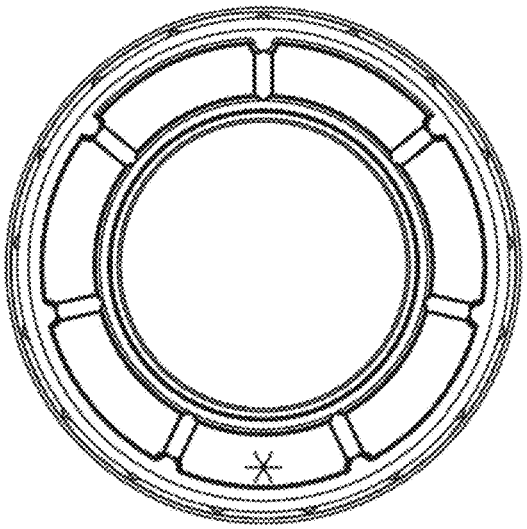
FIG. 19C is a top view of the beverage container lid of FIG. 19A.
Figure 19A:
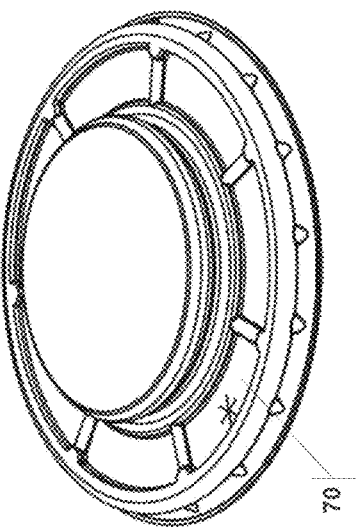
FIG. 19A is a top perspective view of a second embodiment of the beverage container lid.
Figure 20:
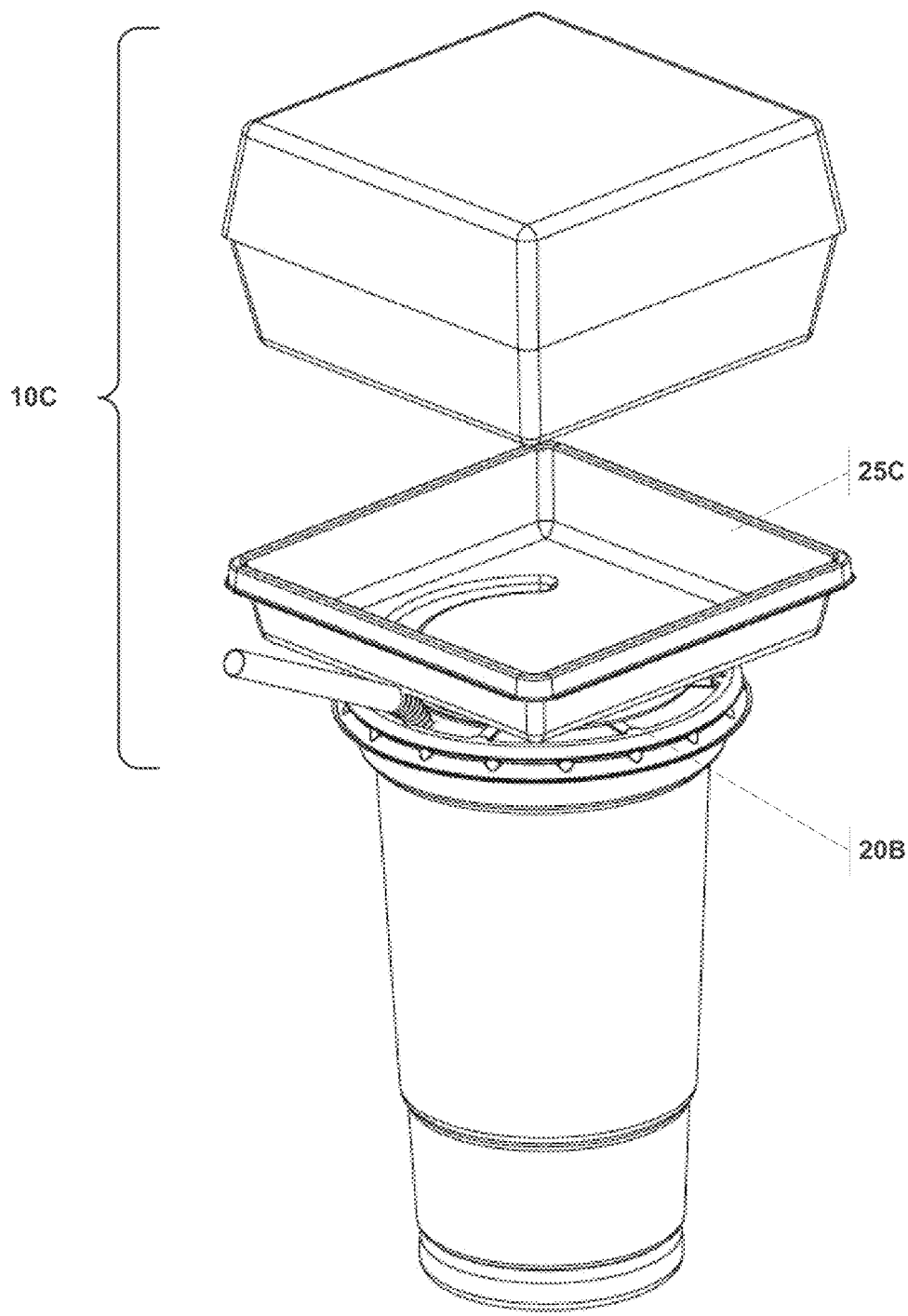
FIG. 20 is a top perspective view of a third embodiment of a portable packaging system where a tray is detachably coupled to the beverage container lid of FIG. 19A, and the tray is dimensioned to receive a food container with a square footprint.
Figures 21A, 21B:
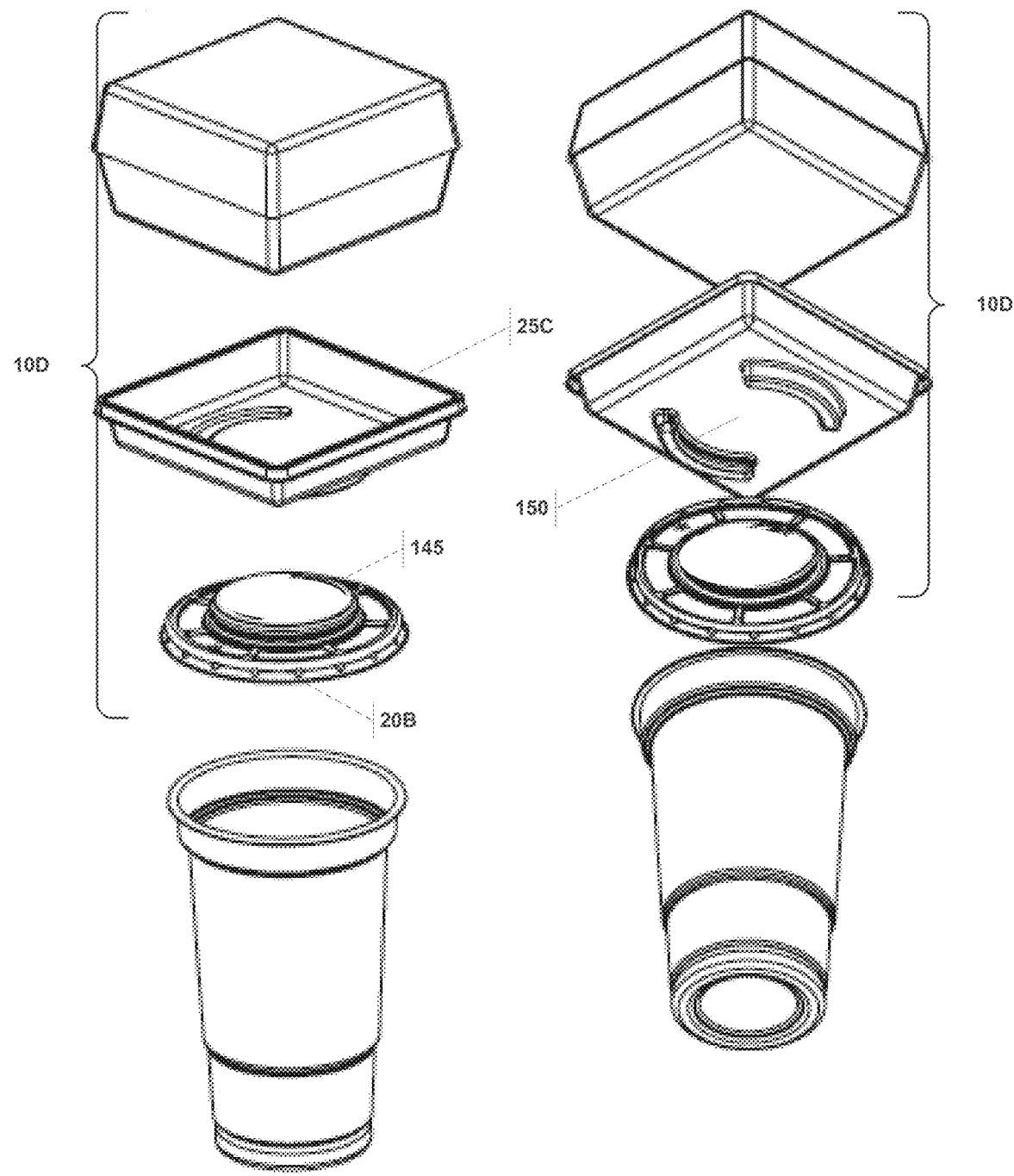
FIG. 21A is a top perspective exploded view showing the portable packaging system of FIG. 20.
FIG. 21B is a bottom perspective exploded view showing the portable packaging system of FIG. 20.
Figure 23:
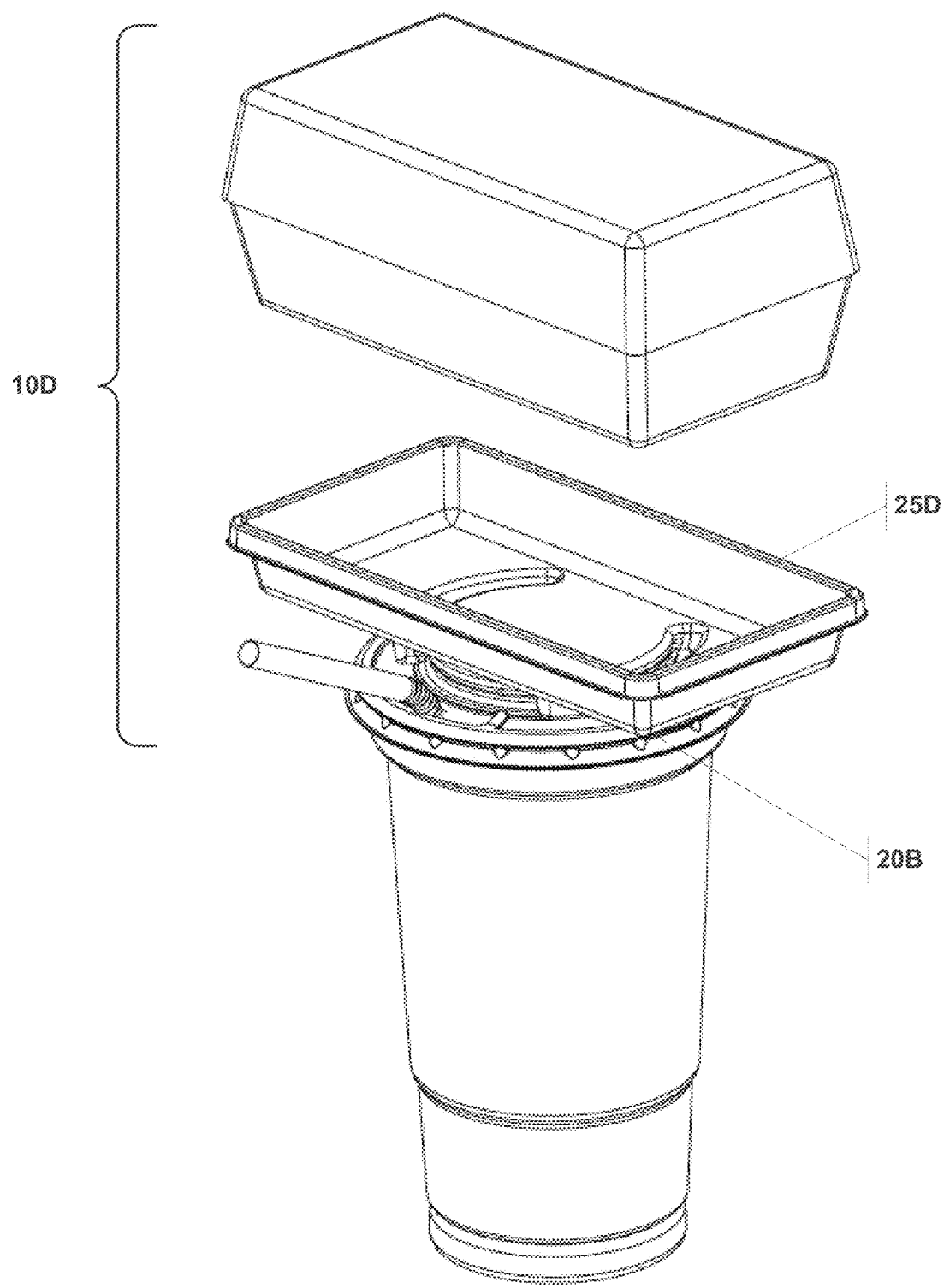
FIG. 23 is a top perspective view of a fourth embodiment of a portable packaging system where a tray is detachably coupled to the beverage container lid of FIG. 19A, and the tray is dimensioned to receive a food container with a rectangular footprint.
Figures 24A, 24B:
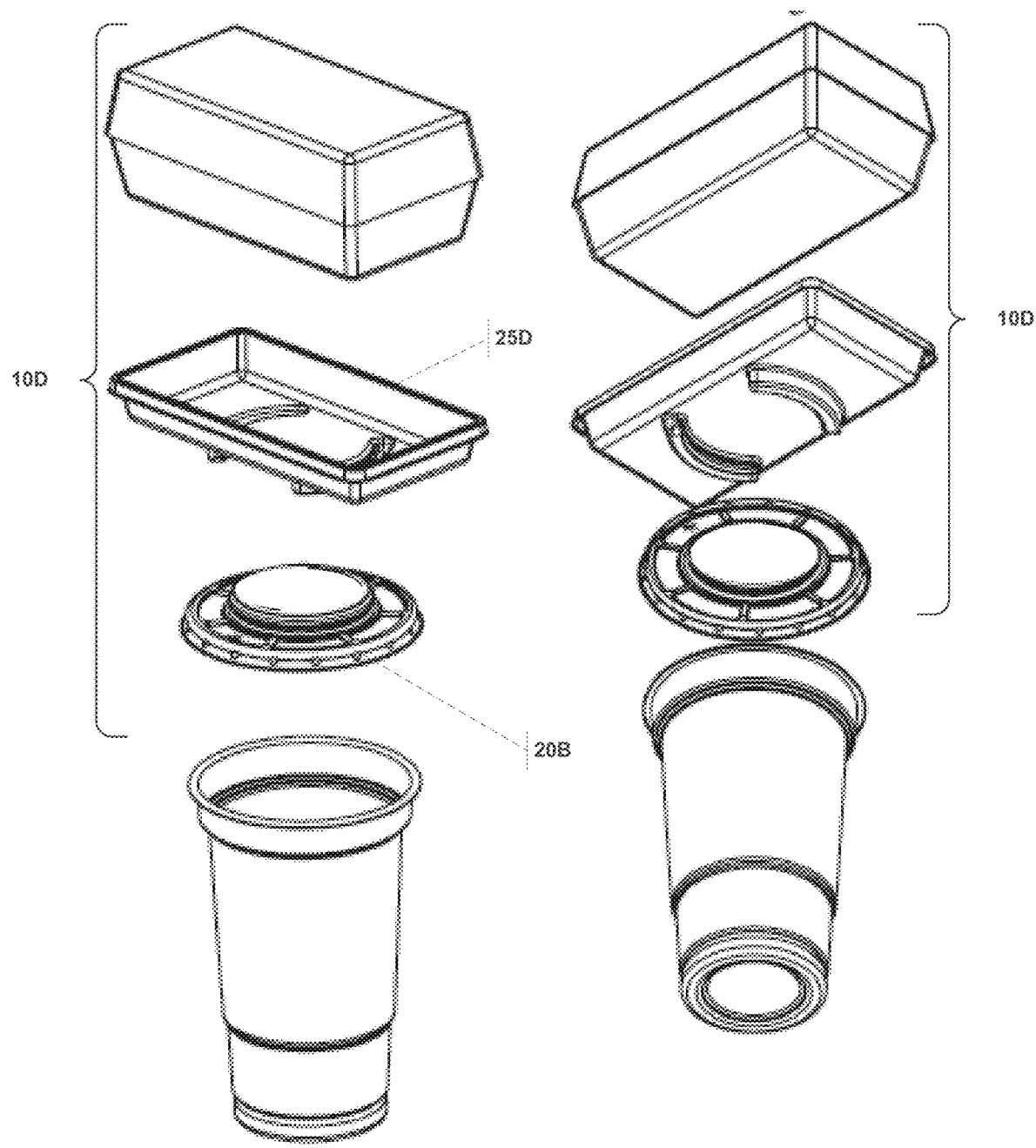
FIG. 24A is a top perspective exploded view showing the portable packaging system of FIG. 23.
FIG. 24B is a bottom perspective exploded view showing the portable packaging system of FIG. 23.
Figure 25C:
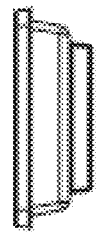
FIG. 25C is a side view of the tray of FIG. 23.
Figure 25E:
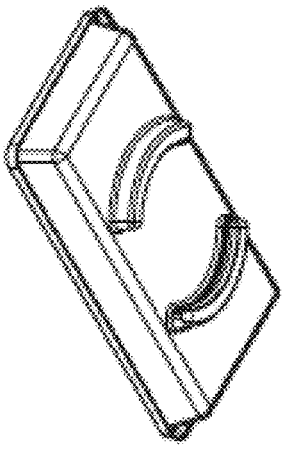
FIG. 25E is a bottom perspective view of the tray of FIG. 23.
Figure 25B:
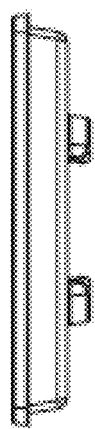
FIG. 25B is a front view of the tray of FIG. 23.
Figure 25D:
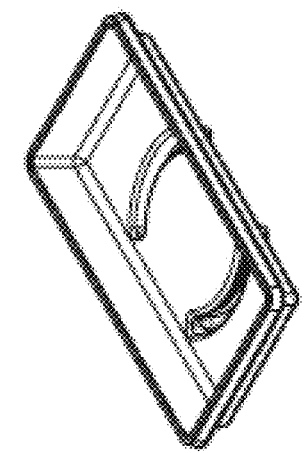
FIG. 25D is a top perspective view of the tray of FIG. 23.
Figure 25A:
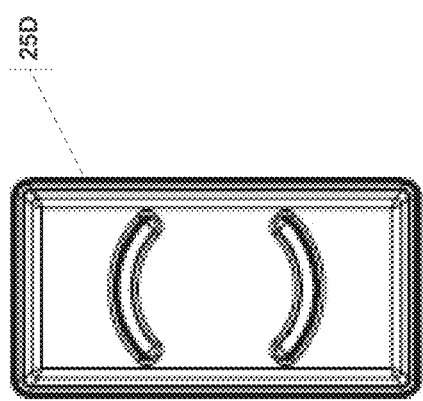
FIG. 25A is a top view of the tray of FIG. 23.

It is also possible to form the tray coupling structure and the complementary tray coupling structure of the beverage container lid in various configurations. The lid 20 shown in FIGS. 1-6 and 10-16E, is a female-type coupling where the tray coupling structure inserts into the complementary tray coupling structure. FIGS. 19A and B illustrate a male-type coupling beverage container lid 20B. FIGS. 20-22E show a square portable packaging system that utilizes male coupling 10C. In this embodiment, the square tray 25C is configured to accept a male coupling structure, which is shown as a post 145 that inserts into the tray coupling space 150. FIGS. 23-25E illustrate a similar rectangular portable packaging system 10D that uses the male-type coupling beverage container lid 20B.

6.2 A Portable Packaging System that without a Separate Food Container

Turning to FIGS. 26A-D a circular tray 25E is disclosed. Here, the tray walls are taller than in the previous disclosures to accommodate food being placed directly into the tray—i.e., with no need for a separate food container. The lid 20 shown in FIGS. 26A-D is the same lid shown with respect to FIGS. 1-6 and 10-16E. The benefit of this lid 20 is that it is specially designed to allow a straw to be inserted into the hole without interfering with the bottom outer corner of the tray or food container.

Figure 26B:
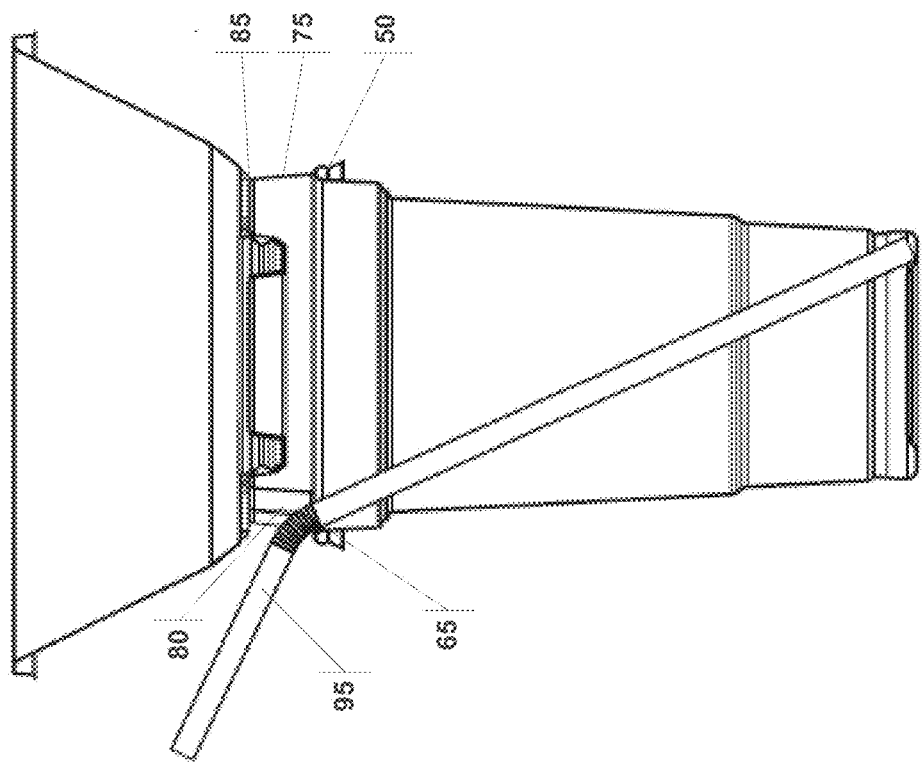
FIG. 26B illustrates a cross-section side view of the circular tray of FIG. 26A, which details the elevated position of the circular tray relative to the straw hole, which allows the straw to access the contents of the beverage container without interference from the outer bottom corner of the circular tray.
Figure 26A:
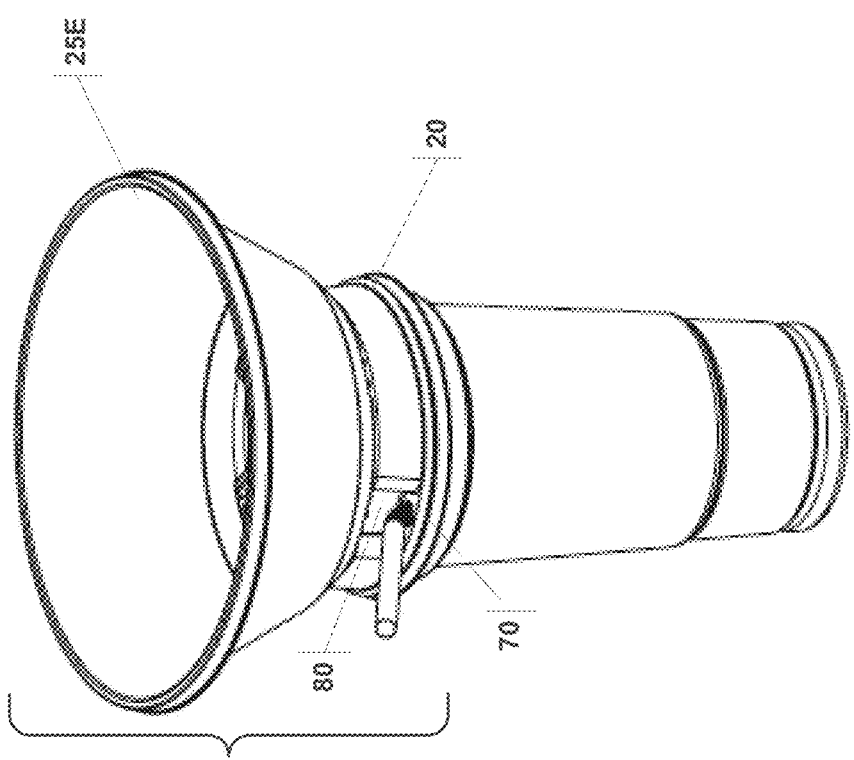
FIG. 26A illustrates a top perspective view of a circular tray that may be used without a food container, wherein the circular tray is attached to a beverage container lid.
Figure 26D:
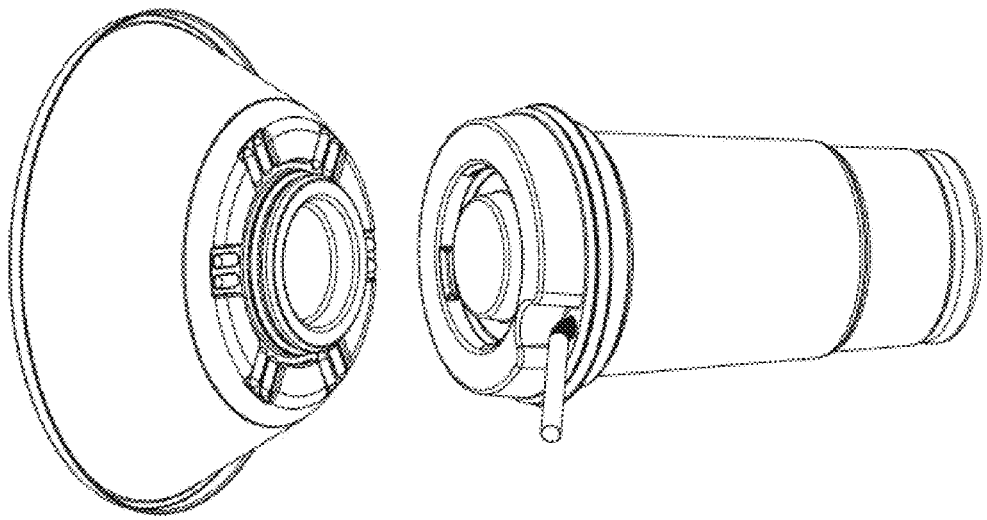
FIG. 26D illustrates a bottom perspective view of the circular tray of FIG. 26A that may be used without a food container, wherein the circular tray is detached from a beverage container lid.
Figure 26C:
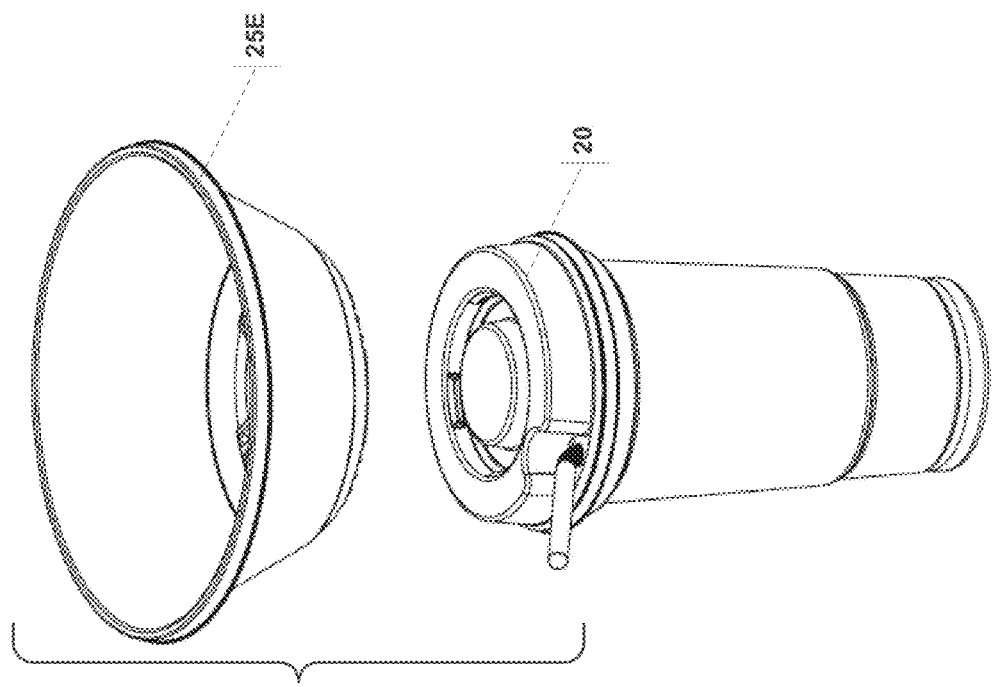
FIG. 26C illustrates a top perspective view of the circular tray of FIG. 26A that may be used without a food container, wherein the circular tray is detached from a beverage container lid.
Figure 27B:
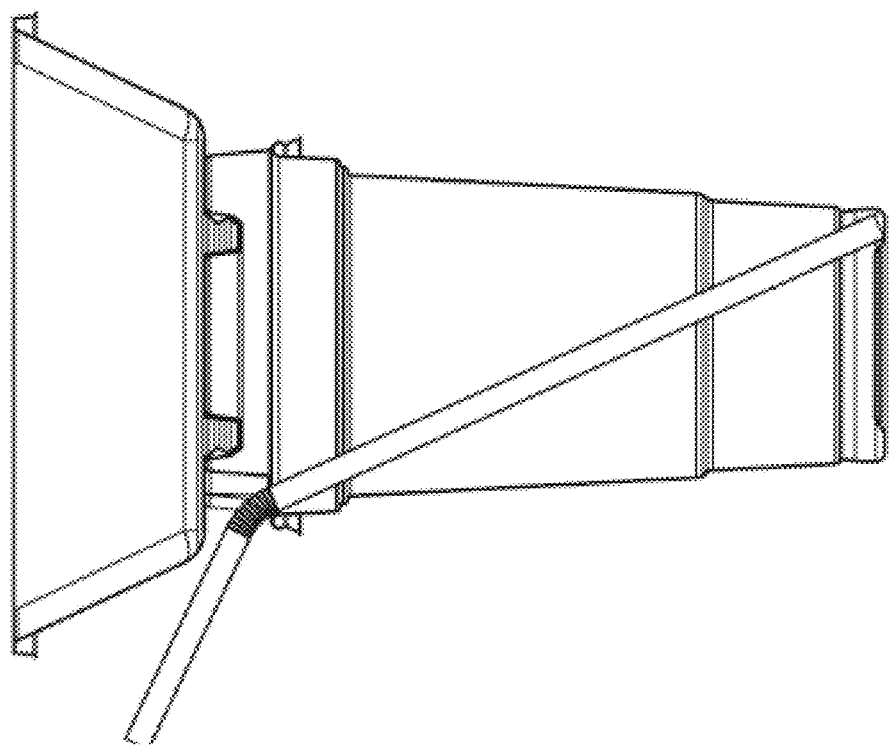
FIG. 27B illustrates a cross-section side view of the inverted truncated pyramid tray of FIG. 27A, which details the elevated position of the tray relative to the straw hole, which allows the straw to access the contents of the beverage container without interference from the outer bottom corner of the tray.
Figure 27A:
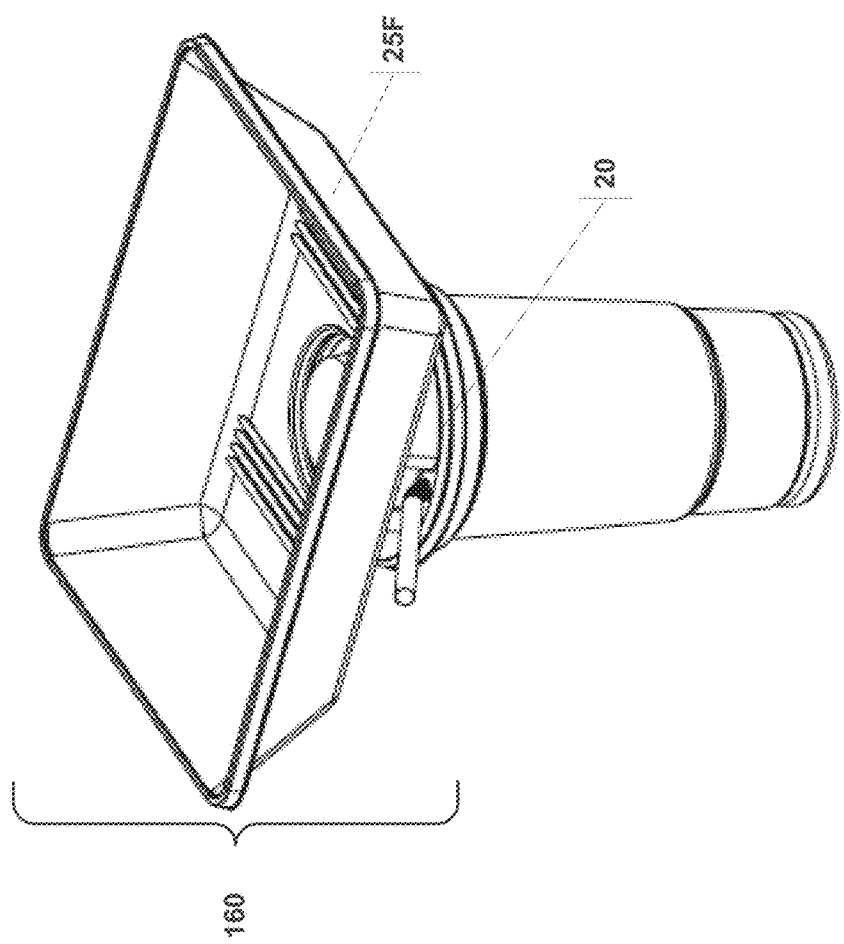
FIG. 27A illustrates a top perspective view of an inverted truncated pyramid tray that may be used without a food container, wherein the tray is attached to a beverage container lid.
Figure 27D:
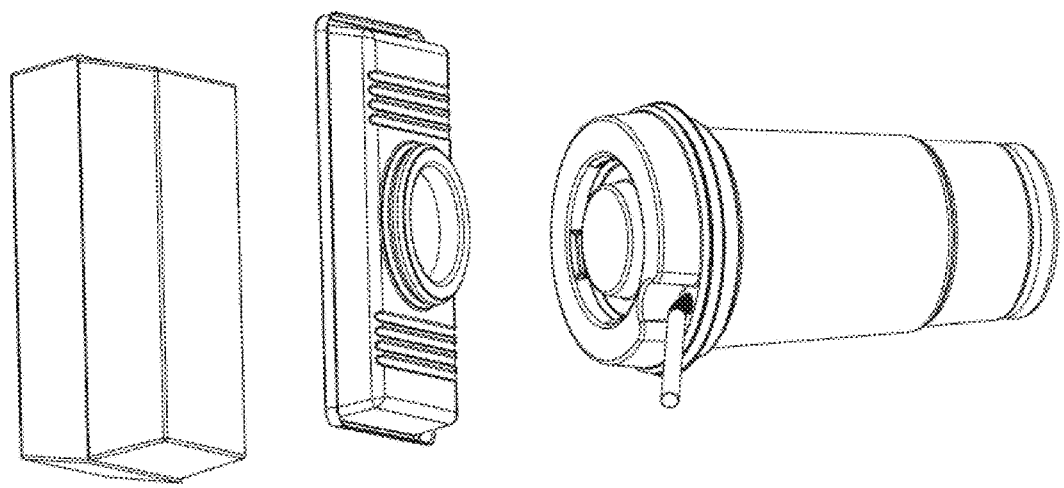
FIG. 27D illustrates a bottom perspective view of the inverted truncated pyramid tray of FIG. 27A that may be used without a food container, wherein the tray is detached from a beverage container lid.
Figure 27C:
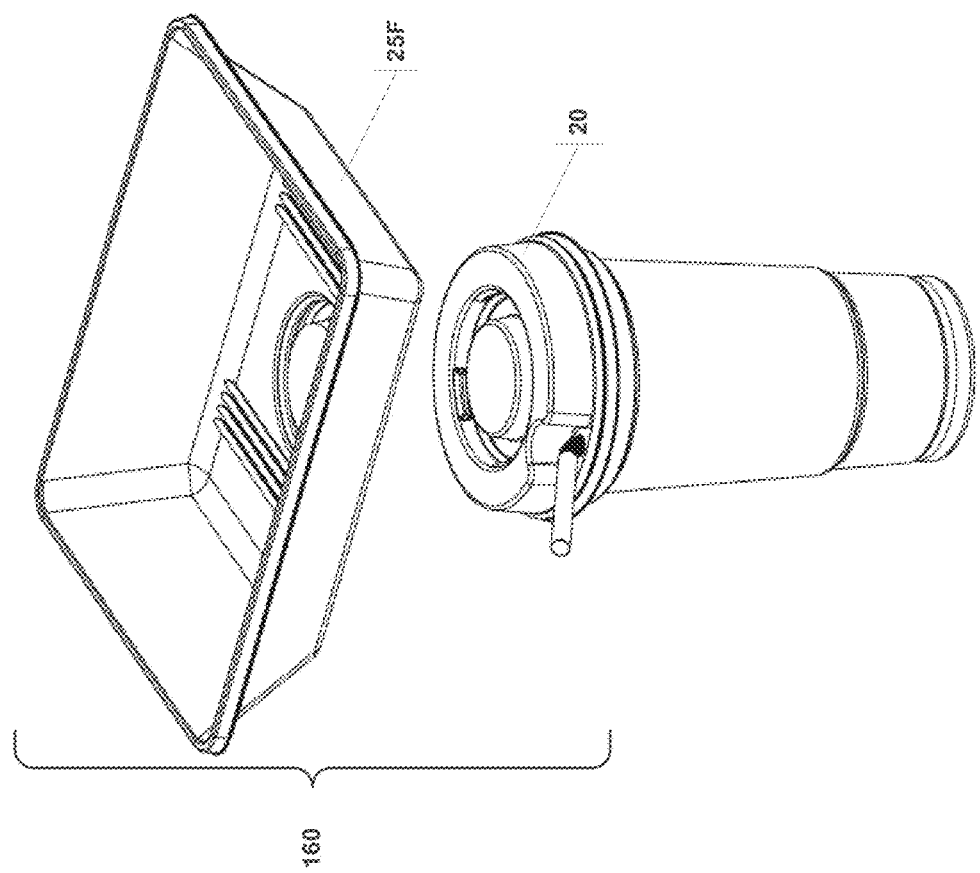
FIG. 27C illustrates a top perspective view of the inverted truncated pyramid tray of FIG. 27A that may be used without a food container, wherein the tray is detached from a beverage container lid.

FIG. 26B illustrates a cross-sectional view of the circular tray 25E with a straw 95 inserted into the hole 65. Further, the beverage container lid riser wall 75 may extend upwardly away from the rim coupling structure 50, and an upper planar surface 85 may extend from the beverage container lid riser wall 75, wherein the upper planar surface 85 comprises the complementary tray coupling structure 90. The height of the beverage container lid riser wall 75 may be sufficient to eliminate interference and allow a straw to access the contents of the beverage container 60 through the hole 65, when the tray 25E is coupled to the beverage container lid 20. The beverage container lid riser wall 75 may also include a cutout 80, and the hole planar surface 70 is connected to the beverage container lid riser wall 75 at the cutout 80. These features of the lid 20 are also shown in FIGS. 26C and 26D, as part of a portable packaging system 155 with the circular tray 25E. Similarly, FIGS. 27A-D illustrate an inverted truncated pyramid tray 25F used as part of a portable packaging system 160 with lid 20.

The food container tray herein may be constructed using a variety of methods, including by non-limiting example thermoformed (thin gauge) and thin wall injection molding. The types of material that would be apparent to one of skill in the art may include by non-limiting example PP (polypropylene), PET (polyethylene terephthalate), CPET, RPET Polyethylene (HDPE/LDPE), styrene, HIPS, HMWPE, PP/PE blends, custom blends of thermoplastics (which may or may not include post-consumer or post-industrial content) and other proprietary blends of thermoplastics.

Although exemplary embodiments and applications of the invention have been described herein, including those as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A portable packaging system comprising:
    a food container, comprising:
        a food container bottom and a food container wall extending from the food container bottom, wherein the wall defines a food container footprint;
    a beverage container lid comprising:
        a rim coupling structure adapted to detachably couple to the rim of a beverage container;
        a hole adapted to allow access to the contents of the beverage container when the beverage container lid is coupled to the beverage container; and
        a complementary tray coupling structure;
    a tray comprising:
        a tray bottom and a tray wall extending from the tray bottom, the tray walls define a tray footprint, wherein the tray footprint complements the food container footprint such that the food compartment can securely nest in the tray;
        the tray bottom comprising a tray coupling structure adapted to detachably couple to the complementary tray coupling structure.

2. The system of claim 1, wherein the tray wall is 25%-75% as tall as the food container wall.

3. The system of claim 1, wherein the rim coupling structure defines a rim plane, and the beverage container lid further comprises:
    a hole planar surface extending from the rim coupling structure in substantially the same plane as the rim plane, wherein the hole planar surface comprises the hole;
    a beverage container lid riser wall extending from the rim coupling structure; and
    an upper planar surface extending from the beverage container lid riser wall, wherein the upper planar surface comprises the complementary tray coupling structure.

4. The system of claim 3, wherein the height of the beverage container lid riser wall is sufficient to allow a straw to access the contents of the beverage container through the hole, when the tray is coupled to the beverage container lid.

5. The system of claim 3, wherein the beverage container lid riser wall comprises a cutout, and the hole planar surface is connected to the beverage container lid riser wall at the cutout.

6. The system of claim 1, wherein the tray bottom comprises strengthening ribs.

7. The system of claim 1, wherein a first portion of a tray wall extends vertically away from the tray bottom, and a second portion extends vertically towards the tray bottom, wherein a top rim wall connects the first and second tray wall portions and forms a strengthened tray rim.

8. The system of claim 1, wherein the food container is constructed of paper, cardboard or pulp, and the tray is constructed of non-paper.

9. The system of claim 1, wherein the food container is constructed of a biodegradable material.

10. The system of claim 1, wherein the food container comprises a lid.

11. The system of claim 1, wherein the complementary tray coupling structure comprises a bump-out.

12. The system of claim 1, wherein the tray coupling structure comprises a bump-in.

13. The system of claim 1, wherein the complementary tray coupling structure comprises a bump-out and the tray coupling structure comprises a bump-in, wherein the bump-out is complementary to the bump-in, and the bump-out deflects when the tray is mated to the beverage container lid.

14. The system of claim 1, wherein the shape of the food container footprint is one of square, rectangular or circular.

15. The system of claim 1, wherein the tray wall comprises a tray wall bump-out that applies pressure to the food container when the food container is nested in the tray.

16. A portable packaging system used with a food container comprising a food container bottom and a food container wall extending from the food container bottom, wherein the wall defines a food container footprint, the system comprising:
    a beverage container lid comprising:
        a rim coupling structure adapted to detachably couple to the rim of a beverage container;
        a hole adapted to allow access to the contents of the beverage container when the beverage container lid is coupled to the beverage container; and
        a complementary tray coupling structure;
    a tray comprising:
        a tray bottom and a tray wall extending from the tray bottom, wherein the tray walls define a tray footprint, and wherein the tray footprint complements the food container footprint such that the food container can securely nest in the tray;
        the tray bottom comprising a tray coupling structure adapted to detachably couple to the complementary tray coupling structure.

17. The system of claim 16, wherein the tray wall is 25%-75% as tall as the food container wall.

18. The system of claim 16, wherein the rim coupling structure defines a rim plane, and the beverage container lid further comprises:
    a hole planar surface extending from the rim coupling structure in substantially the same plane as the rim plane, wherein the hole planar surface comprises the hole;
    a beverage container lid riser wall extending from the rim coupling structure; and
    an upper planar surface extending from the beverage container lid riser wall, wherein the upper planar surface comprises the complementary tray coupling structure.

19. The system of claim 18, wherein the height of the beverage container lid riser wall is sufficient to allow a straw to access the contents of the beverage container through the hole when the tray is coupled to the beverage container lid.

20. The system of claim 18, wherein the beverage container lid riser wall comprises a cutout, and the hole planar surface is connected to the beverage container lid riser wall at the cutout.

21. The system of claim 16, wherein the tray bottom comprises strengthening ribs.

22. The system of claim 16, wherein a first portion of tray wall extends vertically away from the tray bottom, and a second portion extends vertically towards the tray bottom, wherein a top rim wall connects the first and second tray wall portions and forms a strengthened tray rim.

23. The system of claim 16, wherein the complementary tray coupling structure comprises a bump-out.

24. The system of claim 16, wherein the tray coupling structure comprises a bump-in.

25. The system of claim 16, wherein the complementary tray coupling structure comprises a bump-out and the tray coupling structure comprises a bump-in, wherein the bump-out is complementary to the bump-in, and the bump-out deflects when the tray is mated to the beverage container lid.

26. The system of claim 16, wherein the shape of the food container footprint is one of square, rectangular or circular.

27. The system of claim 16, wherein the tray wall comprises a tray wall bump-out that applies pressure to the food container when the food container is nested in the tray.

28. A system comprising:

a beverage container lid comprising:

- a rim coupling structure adapted to detachably couple to the rim of a beverage container, rim coupling structure defines a rim plane;
- a hole planar surface extending from the rim coupling structure in substantially the same plane as the rim plane, wherein the hole planar surface comprises a hole adapted to allow access to the contents of the beverage container when the beverage container lid is coupled to the beverage container;
- a beverage container lid riser wall extending from the rim coupling structure, wherein the height of the beverage container lid riser wall is sufficient to allow a straw to access the contents of the beverage container through the hole when a tray is coupled to the beverage container lid; and
- an upper planar surface extending from the beverage container lid riser wall, wherein the upper planar surface comprises a complementary tray coupling structure;

said tray comprising:

- a tray bottom and a tray wall extending from the tray bottom, the tray walls define a food volume;
- the tray bottom comprising a tray coupling structure adapted to detachably couple to the complementary tray coupling structure.

29. The system of claim 28, wherein the beverage container lid riser wall comprises a cutout, and the hole planar surface is connected to the beverage container lid riser wall at the cutout.

30. The system of claim 28, wherein the tray bottom comprises strengthening ribs.

31. The system of claim 28, wherein a first portion of tray wall extends vertically away from the tray bottom, and a second portion extends vertically towards the tray bottom, wherein a torn rim wall connects the first and second tray wall portions and forms a strengthened tray rim.

32. The system of claim 28, wherein the complementary tray coupling structure comprises a bump-out.

33. The system of claim 28, wherein the tray coupling structure comprises a bump-in.

34. The system of claim 28, wherein the complementary tray coupling structure comprises a bump-out and the tray coupling structure comprises a bump-in, wherein the bump-out is complementary to the bump-in, and the bump-out deflects when the tray is mated to the beverage container lid.

35. The system of claim 28, further comprising a food container configured to nest in the tray.

* * * * *